(12) United States Patent
Zhang et al.

(10) Patent No.: US 12,519,127 B2
(45) Date of Patent: *Jan. 6, 2026

(54) SECONDARY BATTERY, BATTERY MODULE, BATTERY PACK, AND ELECTRIC DEVICE

(71) Applicant: CONTEMPORARY AMPEREX TECHNOLOGY (HONG KONG) LIMITED, Hong Kong (CN)

(72) Inventors: Limei Zhang, Ningde (CN); Peipei Chen, Ningde (CN); Jiao Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,864

(22) Filed: Mar. 15, 2024

(65) Prior Publication Data

US 2025/0183352 A1 Jun. 5, 2025

Related U.S. Application Data

(63) Continuation of application No. PCT/CN2022/084874, filed on Apr. 1, 2022.

(51) Int. Cl.
*H01M 10/0525* (2010.01)
*H01M 4/136* (2010.01)
(Continued)

(52) U.S. Cl.
CPC ....... *H01M 10/0525* (2013.01); *H01M 4/136* (2013.01); *H01M 4/366* (2013.01);
(Continued)

(58) Field of Classification Search
None
See application file for complete search history.

(56) References Cited

U.S. PATENT DOCUMENTS

2013/0209886 A1 8/2013 Ohira et al.

FOREIGN PATENT DOCUMENTS

| CN | 102420324 A | 4/2012 |
|---|---|---|
| CN | 103069624 A | 4/2013 |

(Continued)

OTHER PUBLICATIONS

M. Dahbi, F. Ghamouss, F. Tran-Van, D. Lemordant, M. Anouti. Comparative study of EC/DMC LiTFSI and LiPF6 electrolytes for electrochemical storage, Journal of Power Sources 196 (2011) 9743-9750.*

(Continued)

*Primary Examiner* — Carlos Barcena
(74) *Attorney, Agent, or Firm* — K&L Gates LLP

(57) ABSTRACT

Provided are a secondary battery, a battery module, a battery pack, and an electric device. The secondary battery includes a cathode piece and a non-aqueous electrolyte. The cathode active material includes a core and a shell covering the core. The core includes $Li_{1+x}Mn_{1-y}A_yP_{1-z}R_zO_4$. The shell includes: a first cladding layer covering the core, and a second cladding layer covering the first cladding layer. The first cladding layer includes pyrophosphate $MP_2O_7$ and phosphate $XPO_4$, and the second cladding layer contains carbon. The non-aqueous electrolyte includes a first lithium salt and a first additives, the first lithium salt is one or more selected from the group consisting of $LiN(C_mF_{2m+1}SO_2)(C_nF_{2n+1}SO_2)$ and $Li(FSO_2)_2N$, in which, m and n represent positive integers. The first additive includes one or more of a compound represented by: $O=C=N-R_1-N=C=O$.

21 Claims, 3 Drawing Sheets

(51) Int. Cl.
　　　*H01M 4/36*　　　(2006.01)
　　　*H01M 4/58*　　　(2010.01)
　　　*H01M 4/62*　　　(2006.01)
　　　*H01M 10/0567*　(2010.01)
　　　*H01M 10/0568*　(2010.01)
　　　*H01M 10/0569*　(2010.01)
　　　*H01M 4/02*　　　(2006.01)

(52) U.S. Cl.
　　　CPC ......... *H01M 4/5825* (2013.01); *H01M 4/625* (2013.01); *H01M 10/0567* (2013.01); *H01M 10/0568* (2013.01); *H01M 10/0569* (2013.01); *H01M 2004/021* (2013.01); *H01M 2004/028* (2013.01); *H01M 2220/20* (2013.01); *H01M 2300/0051* (2013.01)

(56) References Cited

FOREIGN PATENT DOCUMENTS

| CN | 103928664 A | 7/2014 |
|---|---|---|
| CN | 104124451 A | 10/2014 |
| CN | 106058225 A | 10/2016 |
| CN | 109755636 A | 5/2019 |
| CN | 110416525 A | 11/2019 |
| CN | 111446429 A | 7/2020 |
| CN | 112216868 A | 1/2021 |
| CN | 114242988 A | 3/2022 |
| CN | 114256448 A | 3/2022 |
| JP | 2011014379 A | 1/2011 |
| JP | 2011044339 A | 3/2011 |
| JP | 2012182130 A | 9/2012 |
| JP | 2014056722 A | 3/2014 |
| JP | 2015082476 A | 4/2015 |
| JP | 2015144104 A | 8/2015 |
| JP | 2017103060 A | 6/2017 |
| KR | 20150135278 A | 12/2015 |
| KR | 20190078392 A | 7/2019 |
| WO | 2018032569 A1 | 2/2018 |
| WO | 2021023131 A1 | 2/2021 |
| WO | 2021042981 A1 | 3/2021 |

OTHER PUBLICATIONS

Decision to Grant a Patent received in the counterpart Japanese application 2023-547874, mailed on Oct. 15, 2024.
Request for the Submission of an Opinion received in the counterpart Korean application 10-2024-7029267, mailed on Dec. 4, 2024.
Request for the Submission of an Opinion received in the counterpart Korean application 10-2024-7029266, mailed on Dec. 18, 2024.
The first office action received in the counterpart Chinese Application 202280011811.4, mailed on Apr. 16, 2024.
The Grant Notice received in the counterpart Chinese Application 202280011811.4, mailed on May 9, 2024.
The Grant Notice received in the counterpart Korean Application 10-2023-7027029, mailed on May 29, 2024.
The Notice of Reasons for Refusal received in the counterpart Japanese Application 2023-547874, mailed on Jun. 10, 2024.
International Search Report received in the corresponding International Application PCT/CN2022/084874, mailed Dec. 14, 2022.
Written Opinion of ISA received in the corresponding International Application PCT/CN2022/084874, mailed Dec. 14, 2022.
First office action received in the corresponding Korean Application 10-2023-7027029, mailed Jan. 28, 2024.
The extended European search report received in the counterpart EP application 22930128.8, mailed on Feb. 11, 2025. 13 pages.
The Grant Notice received in the counterpart KR application 10-2024-7029266, dated May 13, 2025, 6 pages with English translation.
The Grant Notice received in the counterpart KR application 10-2024-7029267, dated Jun. 5, 2025, 6 pages with English translation.

* cited by examiner

SECONDARY BATTERY, BATTERY MODULE, BATTERY PACK, AND ELECTRIC DEVICE

CROSS REFERENCE TO RELATED MATTER

This application is a continuation of international application PCT/CN2022/084874, filed Apr. 1, 2022 and entitled "SECONDARY BATTERY, BATTERY MODULE, BATTERY PACK, AND ELECTRIC DEVICE", the entire content of which is hereby incorporated by reference in its entirety.

TECHNICAL FIELD

The present application relates to the technical field of lithium batteries, and more particularly to a secondary battery, a battery module, a battery pack, and an electric device.

BACKGROUND

In recent years, as the application range of lithium-ion batteries has become more and more extensive, lithium-ion batteries have been widely used in energy storage power systems such as hydropower, thermal power, wind power, and solar power stations, as well as power tools, electric bicycles, electric motorcycles, electric vehicles, military equipment, aerospace, and other fields. Due to the great development of lithium-ion batteries, higher requirements have been exerted on energy density, cycle performance, and safety performance.

Compared with other cathode active materials, lithium manganese phosphate cathode active materials have higher safety and cycle life, but is disadvantageous in its poor rate performance, which is usually solved by means of coating or doping. However, it is still desired to further improve the rate performance, cycle performance, and high temperature stability of lithium manganese phosphate cathode active materials.

SUMMARY

The present application is made in view of the above problems, and it is an objective of the present application to provide a secondary battery, a battery module, a battery pack, and an electric device, so as to solve the problem that the lithium manganese phosphate secondary battery has poor rate performance and cycle performance.

In order to achieve the above object, a first aspect of the present application provides a secondary battery, comprising a cathode piece and a non-aqueous electrolyte, in which, the cathode piece comprises a cathode active material, and the cathode active material comprises a core and a shell covering the core; the core comprises $Li_{1+x}Mn_{1-y}A_yP_{1-z}R_zO_4$, in which, x=−0.100 to 0.100, y=0.001 to 0.500, z=0.001 to 0.100, and A is one or more selected from the group consisting of Zn, Al, Na, K, Mg, Mo, W, Ti, V, Zr, Fe, Ni, Co, Ga, Sn, Sb, Nb, and Ge, optionally one or more selected from the group consisting of Fe, Ti, V, Ni, Co, and Mg, and R is one or more selected from the group consisting of B, Si, N and S; the shell comprises: a first cladding layer covering the core, and a second cladding layer covering the first cladding layer, in which, the first cladding layer comprises pyrophosphate $MP_2O_7$ and phosphate $XPO_4$, in which, M and X are each independently one or more selected from the group consisting of Li, Fe, Ni, Mg, Co, Cu, Zn, Ti, Ag, Zr, Nb, and Al; and the second cladding layer comprises carbon; the non-aqueous electrolyte includes a first lithium salt and a first additive, and the first lithium salt is one or more selected from the group consisting of LiN($C_mF_{2m+1}SO_2$)($C_nF_{2n+1}SO_2$) and Li(FSO$_2$)$_2$N, m and n represent positive integers;

the first additive includes one or more of the compounds represented by Formula 1,

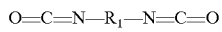  Formula 1 in which, $R_1$ represents any one of a $C_2$-$C_{10}$ alkylene, a $C_2$-$C_{10}$ heteroalkylene, a $C_6$-$C_{18}$ arylene, a $C_2$-$C_{18}$ heteroarylene, a $C_3$-$C_{18}$ alicyclylene, a $C_3$-$C_{18}$ heteroalicyclylene, which are substituted by one or more $R_a$ or are unsubstituted, and $R_a$ comprises one or more selected from a halogen atom, —CN, —NCO, —OH, —COOH, —SOOH, a —COOR$_b$, a $C_2$-$C_{10}$ alkyl, a $C_2$-$C_{10}$ alkenyl, a $C_2$-$C_{10}$ alkynyl, a $C_2$-$C_{10}$ oxaalkyl, and $R_b$ is any one selected from $C_1$-$C_{10}$ alkyls.

Unless otherwise stated, in the above chemical formula, when A is two or more elements, the limitation on the numerical range of y is not only a limitation on a stoichiometric number of each element as A, but also a limitation on a sum of stoichiometric numbers of all elements as A. For example, when A is two or more elements A1, A2 . . . An, the stoichiometric numbers y1, y2 . . . yn of A1, A2 . . . An each need to fall within the numerical range defined by the application for y, and the sum of y1, y2 . . . yn also needs to fall within this value range. Similarly, for the case where R is two or more elements, the limitation of the numerical range of the stoichiometric number of R in the present application also has the above meaning.

The lithium manganese phosphate cathode active material of the present application has a core-shell structure with two cladding layer s, in which, the core includes $Li_{1+x}Mn_{1-y}A_yP_{1-z}R_zO_4$. The element A doped at the manganese position of lithium manganese phosphate in the core helps to reduce the lattice change rate of lithium manganese phosphate during lithium deintercalation, improves the structural stability of lithium manganese phosphate cathode material, and greatly reduces the dissolution of manganese and the oxygen activity on the particle surface. The element R doped at the phosphorus site helps to change the difficulty of the change of the Mn—O bond length, thereby reducing the migration barrier of lithium ions, promoting the migration of lithium ions, and improving the rate performance of the secondary battery.

The first cladding layer of the cathode active material of the present application includes pyrophosphate and phosphate. Due to the high migration barrier (>1 eV) of transition metals in pyrophosphate, the dissolution of transition metals can be effectively inhibited. Phosphate has an excellent ability to conduct lithium ions, and can reduce the content of lithium impurities on the surface. In addition, since the second cladding layer is a carbon-containing layer, the electrical conductivity and desolvation ability of LiMnPO$_4$ can be effectively improved. In addition, the "barrier" effect of the second cladding layer can further hinder the migration of manganese ions into the electrolyte and reduce the corrosion of the active materials by the electrolyte.

Therefore, the present application can effectively suppress the dissolution of manganese ions during lithium deintercalation by performing specific element doping and surface coating on lithium manganese phosphate, and at the same time promote the migration of lithium ions, thereby improving the rate performance of the battery cell and improving the cycle performance and high temperature performance of the secondary battery.

It should be noted that, as shown in FIG. 1, in the present application, by comparing the XRD spectra before and after $LiMnPO_4$ doping, it can be seen that the cathode active material of the present application is basically consistent with the positions of the main characteristic peaks before $LiMnPO_4$ doping, indicating that the doped lithium manganese phosphate cathode active material has no impurity phase, and the improvement of secondary battery performance mainly comes from element doping rather than impurity phase. In the present application, the cathode active material is obtained by doping the Mn site and the P site of the compound $LiMnPO_4$ with a specific amount of specific elements at the same time and coating the compound surface with two layers, which can greatly reduce the dissolution of transition metals and reduce the oxygen activity on the particle surface, promote the migration of lithium ions, improve the conductivity and desolvation performance of the material, improve the rate performance of the battery, improve the cycle performance and high temperature performance of the secondary battery, and reduce the corrosion of the active material by the electrolyte.

In addition, the non-aqueous electrolyte includes the first lithium salt as the main lithium salt, due to its excellent thermal stability and hydrolysis resistance, the first lithium salt can effectively reduce the acidity of the electrolyte, reduce the dissolution of manganese ions, and improve high-temperature cycle, and storage performance. The isocyanate-based compound represented by Formula 1 is introduced into the electrolyte, and can react with trace water in the battery to form —NHCOOH, prevent trace water from interacting with non-aqueous electrolyte to produce HF, further reduce the acidity of the electrolyte and reduce the dissolution of manganese ions, thereby improving high-temperature cycle and storage performance. Moreover, the isocyanate-based compound represented by Formula 1 can also form a uniform SEI film on the anode, reduce the reduction of dissolved Mn at the anode, and further improve the high-temperature cycle and storage performance.

In some embodiments, $R_1$ represents any one of a $C_2$-$C_{10}$ alkylene, a $C_2$-$C_{10}$ oxaalkylene, a $C_2$-$C_{10}$ azaalkylene, phenylene, naphthylene, anthrylene, cyclobutylene, cyclopentylene, cyclohexylene, biphenylene, methylenediphenylene, which are substituted by one or more $R_a$ or are unsubstituted; optionally, the $R_1$ represents any one of a $C_2$-$C_6$ alkylene, phenylene, naphthylene, anthracene, cyclobutylene, cyclopentylene, cyclohexylene, biphenylene, and methylenediphenylene, which are substituted by one or more $R_a$ or are unsubstituted; and/or, the $R_a$ comprises one or more selected from halogen atoms, —CN, $C_2$-$C_3$ alkyl; and/or, a number of $R_a$ in the compound represented by the Formula 1 is 0, 1, 2, 3, or 4.

Optionally, the first additive includes one or more of the following compounds:

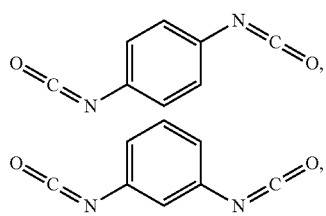

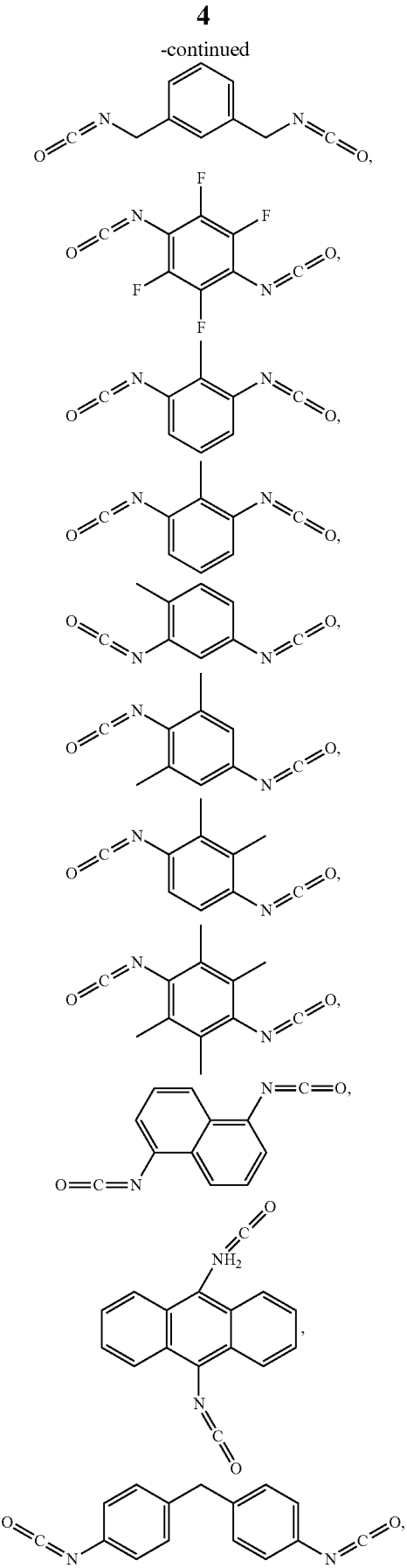

LiN($C_mF_{2m+1}SO_2$)($C_nF_{2m+1}SO_2$) in the first lithium salt may be selected from any corresponding specific substance in the existing technology, and in some embodiments, m and n each independently represent 0, 1, 2, 3 or 4, so as to provide more excellent thermal stability.

In some embodiments of the present application, when the first lithium salt is any one selected from LiN($CF_3SO_2$)(FSO$_2$), Li($CF_3SO_2$)$_2$N, and LiN($C_4F_9SO_2$)(FSO$_2$), the first additive is any one selected from the following compounds:

-continued

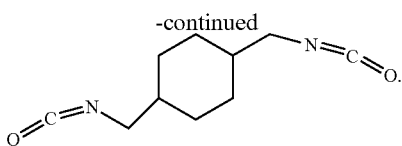

In this way, the advantages of the first lithium salt and the first additive are fully utilized and the acidity of the electrolyte and the dissolution of manganese ions are significantly reduced, and the high-temperature cycle and storage performance of the lithium-ion battery are significantly improved.

In some embodiments, based on a total weight of the non-aqueous electrolyte, a content of the first lithium salt is W1 wt. %, W1 is between 0.1 and 48 (such as 0.1, 0.5, 1, 2, 3, 4, 5, 7, 10, 12, 14, 15, 16, 18, 20, 22, 25, 28, 30, 40, 45, or 48), optionally between 5 and 20, such that the problem of aluminum foil corrosion caused by the first lithium salt at high operating voltage is alleviated.

In some embodiments, a content of the first additive is W2 wt. %, W2 is between 0.01 and 20 (such as 0.01, 0.05, 0.1, 0.2, 0.3, 0.4, 0.5, 1, 2, 3, 4, 5, 8, 10, 12, 15, 18 or 20), optionally between 0.1 and 10 or between 0.3 and 5, when a weight ratio of the first additive in the electrolyte is within the above range, not only is the acidity of the electrolyte lowered and the manganese ion dissolution reduced, but also the deterioration of the impedance of the anode is avoided, thereby improving the high-temperature cycle and storage performance of the lithium-ion battery, while not affecting the capacity and rate performance of the lithium-ion battery.

In some embodiments, the W2/W1 is defined as M, and M is between 0.001 and 3 (such as 0.001, 0.002, 0.005, 0.007, 0.1, 0.2, 0.3, 0.4, 0.5, 1, 2 or 3), optionally between 0.005 and 0.5. When W2/W1 is within the above range, the first lithium salt and the first additives can play a better synergistic effect to ensure that the acidity of the system is low, the dissolution of manganese ions is reduced, and the high-temperature cycle and storage performance of lithium ions are excellent.

On the basis of controlling the content of the first lithium salt, in some embodiments, the lithium salt in the non-aqueous electrolyte can be supplemented by adding a second lithium salt, that is, the non-aqueous electrolyte further includes a second lithium salt, and the second lithium salt includes one or more selected from lithium difluorophosphate, lithium difluorodioxalate phosphate, lithium difluorooxalate borate, lithium bisoxalate borate, $LiPF_6$, and $LiBF_4$. The second lithium salt is added to the non-aqueous electrolyte as a lithium salt-type additive, which will be preferentially decomposed on a surface of an aluminum foil, and the insoluble precipitate formed by the combination of a decomposition product and the aluminum ion adheres to the surface of the aluminum foil, thereby forming a passivation film, which prevents the direct contact between the aluminum foil and the electrolyte, protects the aluminum foil, and in turn cooperates with the first lithium salt to improve high-temperature cycle and storage performance.

In some embodiments, based on the total weight of the non-aqueous electrolyte, the content of the second lithium salt is W3 wt. %, W3 is between 0.01 and 20, optionally between 0.1 and 5 or between 0.3 and 5. When a weight ratio of the second lithium salt in the electrolyte is within the above range, not only is the corrosion of the aluminum foil inhibited, but also the high-temperature cycle and storage performance of the lithium-ion battery are improved, while not deteriorating the capacity and rate performance of the lithium-ion battery.

In some embodiments, (W2+W3)/W1 is defined as N, and N is between 0.01 and 5 (such as 0.01, 0.02, 0.05, 0.08, 0.1, 0.5, 0.8, 1.0, 2, 3, 4 or 5), optionally between 0.02 and 1. When W2/W1 and (W2+W3)/W1 are within the above ranges, the three can play a better synergistic effect, ensuring that the acidity of the system is low, the dissolution of manganese ions is reduced, and the high-temperature cycle and storage performance of lithium ions are excellent; in addition, the corrosion of aluminum foil is effectively inhibited, the high-temperature cycle and storage performance of lithium-ion batteries are improved, while not deteriorating the capacity and rate performance of the lithium-ion battery.

In some embodiments, the non-aqueous electrolyte further includes a second additive, and the second additive includes one or more selected from the group consisting of a cyclic carbonate compound containing an unsaturated bond, a halogen-substituted saturated cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphorous acid ester compound, a phosphate ester compound, a borate ester compound. Those skilled in the art can select the corresponding second additive from the above substances according to actual needs, and the amount of the second additive in the non-aqueous electrolyte can also refer to the existing technology, which will not be repeated in the present application.

In some embodiments, the non-aqueous electrolyte further includes an organic solvent. The type of the organic solvent is not particularly limited and can be selected according to actual needs. Specifically, the organic solvent includes one or more of a cyclic carbonate compound, a chain carbonate compound, and a carboxylate compound. Operationally, the organic solvent includes one or more of dimethyl carbonate, diethyl carbonate, dipropyl carbonate, ethyl methyl carbonate, methyl propyl carbonate, ethylene propyl carbonate, ethylene carbonate, propylene carbonate, butylene carbonate, γ-butyrolactone, methyl formate, ethyl formate, methyl acetate, ethyl acetate, propyl acetate, methyl propionate, ethyl propionate, butyl propionate, tetrahydrofuran.

In some embodiments, based on a weight of the core, the coating amount of the first cladding layer is C1 wt. %, where C1 is greater than 0 and less than or equal to 7, optionally 4 to 5.6; and/or, based on the weight of the core, the coating amount of the second cladding layer is C2 wt. %, C2 is greater than 0 and less than or equal to 6, and can be 3 to 5. When the coating amount of the first cladding layer is within the above range, the dissolution of manganese ions can be further suppressed, and meanwhile the transport of lithium ions can be further promoted, in addition, the following situations can be effectively avoided: if the coating amount of the first cladding layer is too small, pyrophosphate may have insufficient inhibitory effect on the dissolution of manganese ions, and the improvement of lithium ion transport performance may also not significant; and if the coating amount of the first cladding layer is too large, the cladding layer may be too thick, which may increase the battery impedance and affect the kinetic performance of the battery.

In some embodiments, the ratio of (W1+W2)/(C1+C2) is defined as Q, Q is between 0.1 and 10, optionally between 0.5 and 5, when C is less than the above range, the lithium salt and the additive are insufficient to reduce the acidity of the electrolyte, inhibitory effect on the dissolution of manganese ions are limited, and the high-temperature cycle and storage performance cannot be significantly improved; and when C is greater than the above range, the film-forming impedance is too large, and the capacity and rate performance of the lithium-ion battery will be affected and are difficult to be effectively improved.

In some embodiments, in the cathode active material, a weight ratio of pyrophosphate to phosphate in the first cladding layer is between 1:3 and 3:1, optionally between 1:3 and 1:1. The proper weight ratio of pyrophosphate to phosphate is helpful for the two to fully play the synergistic effect, and can effectively avoid the following situations: in case of too much pyrophosphate and too little phosphate, an increase in battery impedance may be resulted; and in case of too much phosphate and too little pyrophosphate, the effect of inhibiting the dissolution of manganese ions is not significant.

In any embodiment, an interplanar spacing of phosphate in the first cladding layer is 0.345-0.358 nm, and an included angle of a crystal direction (111) is 24.25°-26.45°; and an interplanar spacing of pyrophosphate in the first cladding layer is 0.293-0.326 nm, and the included angle of the crystal direction (111) is 26.41°-32.57°. When the interplanar spacing and the included angle of the crystal direction (111) of phosphate and pyrophosphate in the first cladding layer are within the above range, the impurity phase in the cladding layer can be more effectively avoided, thereby further improving the gram capacity of the material, further improving the cycle performance and rate performance of the secondary battery.

In any embodiment of the first aspect to the third aspect, y is selected from any value within a range of 0.1-0.4. By selecting the value of y within this range, the gram capacity and rate performance of the first cathode active material can be further improved.

In any embodiment of the first aspect to the third aspect, M and X are independently selected from one or more elements of Li and Fe.

In any embodiment, a ratio of y to 1−y is selected from between 1:10 and 10:1, optionally between 1:4 and 1:1. Here y represents the sum of stoichiometric numbers of Mn-site doping elements. When the above conditions are met, the energy density and cycle performance of the secondary battery made of the cathode piece can be further improved.

In any embodiment, a ratio of z to 1−z is selected from between 1:999 and 1:9, optionally between 1:499 and 1:249. Here z represents the sum of the stoichiometric numbers of the P-site doping elements. When the above conditions are met, the energy density and cycle performance of the secondary battery made of the cathode piece can be further improved.

In any embodiment, in the first cathode active material, the crystallinities of pyrophosphate and phosphate are independently between 10% and 100%, optionally between 50% and 100%. In the first cladding layer of the lithium manganese phosphate cathode active material in this embodiment, pyrophosphate and phosphate with a certain degree of crystallinity are beneficial to keep the structure of the first cladding layer stable and reduce lattice defects. On the one hand, this is beneficial for pyrophosphate to fully play the effect of hindering the dissolution of manganese ions. On the other hand, it is also beneficial to phosphate to reduce the content of lithium impurities on the surface and the valence state of oxygen on the surface, thereby reducing the interface side reaction between the cathode material and the electrolyte, reducing the consumption of electrolyte, and improving the cycle performance and the safety performance of the secondary battery.

In any embodiment, A is at least two elements selected from Fe, Ti, V, Ni, Co, and Mg. By selecting the doping elements within the above range, it is beneficial to enhance the doping effect. On the one hand, the lattice change rate is further reduced, thereby inhibiting the dissolution of manganese and reducing the consumption of electrolyte and active lithium. On the other hand, it is also beneficial to further reduce the surface oxygen activity and reduce the interface side reaction between the cathode active material and the electrolyte, thereby improving the cycle performance and high temperature storage performance of the battery.

In any embodiment, the concentration of Li/Mn antisite defect in the first cathode active material is less than 4%, optionally less than 2%. In the cathode active material of the present application, the Li/Mn antisite defect refers to the exchange of $Li^+$ and $Mn^{2+}$ positions in the $LiMnPO_4$ lattice. Since the $Li^+$ transport channel is a one-dimensional channel, it is difficult for $Mn^{2+}$ to migrate in the $Li^+$ transport channel. Therefore, the $Mn^{2+}$ of the antisite defect will hinder the transport of $Li^+$. The gram capacity and rate performance of $LiMnPO_4$ can be improved by controlling the concentration of Li/Mn antisite defect at a low level.

In any embodiment, the lattice change rate of the cathode active material is less than 6%, optionally less than 4%. The lithium deintercalation process of $LiMnPO_4$ is a two-phase reaction. The interfacial stress of the two phases is determined by the lattice change rate. The smaller the lattice change rate, the smaller the interfacial stress and the easier $Li^+$ transport. Therefore, the reduction of the lattice change rate of the core will be beneficial to enhance the $Li^+$ transport ability, thereby improving the rate performance of the secondary battery.

In any embodiment, a surface oxygen valence state of the first cathode active material is below −1.88, optionally between −1.98 and −1.88. This is because the higher the valence state of oxygen in the compound is, the stronger the ability thereof to obtain electrons is, that is, the stronger the oxidation is. However, in the first cathode active material of the present application, by controlling the surface valence state of oxygen at a lower level, the reactivity of the surface of the cathode material can be reduced, and the interface side reaction between the cathode material and the electrolyte can be further reduced, thereby further improving the cycle performance and high temperature storage performance of the secondary battery.

In any embodiment, the cathode active material has a compacted density at 3 tons (T) of higher than 2.0 $g/cm^3$, optionally higher than 2.2 $g/cm^3$. The higher the compacted density of the first cathode active material is, that is, the greater the weight of the active material per unit volume is, it is more conducive to increasing the volumetric energy density of the secondary battery.

A second aspect of the present application further provides a battery module, the battery module includes a secondary battery, and the secondary battery is any one of the above-mentioned secondary batteries of the present application.

A third aspect of the present application further provides a battery pack, the battery pack includes a battery module, and the battery module is the above-mentioned battery module of the present application.

A fourth aspect of the present application also provides an electric device, which includes at least one of a secondary battery, a battery module, or a battery pack; and the secondary battery, battery module, and battery pack are the secondary battery, the battery module, the battery pack provided by the present application.

As a result, the battery module and the battery pack of the present application have higher cycle performance and rate characteristics, especially the high temperature stability has also been significantly improved, thereby providing an electric device having the secondary battery, the battery module, or the battery pack of the present application with high power cycle stability and high temperature running stability.

Figure 1:
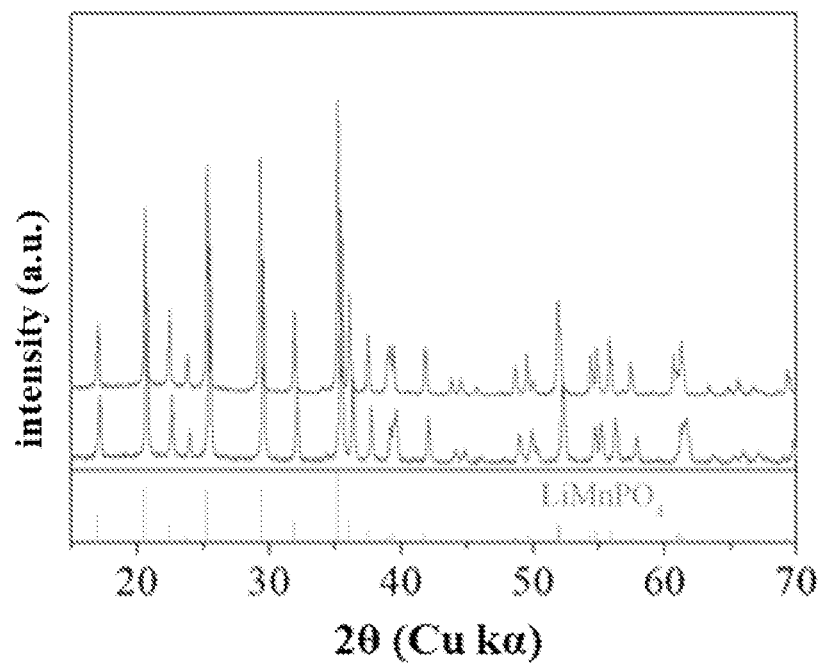
FIG. 1 is an XRD spectrum of a cathode active material according to an embodiment of the present application.

Explanations of reference numerals are as follows:

1 battery pack; 2 upper case; 3 lower case; 4 battery module; 5 secondary battery; 51 housing; 52 electrode assembly; and 53 top cover assembly

DETAILED DESCRIPTION

Hereinafter, embodiments of the secondary battery, battery module, battery pack, and power consumption device of the present application will be specifically disclosed in detail with reference to the accompanying drawings. However, unnecessary detailed description may be omitted. For example, detailed descriptions of well-known items and repeated descriptions of substantially the same configurations may be omitted. This is to avoid the following description from becoming unnecessarily lengthy and to facilitate the understanding of those skilled in the art. In addition, the drawings and the following descriptions are provided for those skilled in the art to fully understand the present application, and are not intended to limit the subject matter described in the claims.

A "range" disclosed herein is defined in terms of a lower limit and an upper limit, and a given range is defined by selecting the lower limit and the upper limit that define a boundary of the particular range. The range defined in this manner may be inclusive or exclusive and may be combined arbitrarily, that is, any lower limit may be combined with any upper limit to form a range. For example, if ranges of 60-120 and 80-110 are listed for a particular parameter, it is understood that ranges of 60-110 and 80-120 are contemplated. Additionally, if minimum range values of 1 and 2 and maximum range values of 3, 4, and 5 are listed, the following ranges are all contemplated: 1-3, 1-4, 1-5, 2-3, 2-4 and 2-5. In the present application, unless otherwise specified, the numerical range "a-b" represents an abbreviated representation of any combination of real numbers between a and b, where a and b are both real numbers. For example, the numerical range "0-5" indicates that all real numbers between "0-5" have been listed in the present application, and "0-5" is only an abbreviated representation of the combination of these values. In addition, when expressing that a certain parameter is an integer ≥2, it is equivalent to the disclosure that the parameter is an integer such as 2, 3, 4, 5, 6, 7, 8, 9, 10, 11, 12, and so on.

Unless otherwise specified, all the implementation modes and optional implementation modes of the present application can be combined with each other to form new technical solutions.

Unless otherwise specified, all the technical features and optional technical features of the present application can be combined with each other to form a new technical solution.

Unless otherwise specified, all steps in the present application can be performed sequentially or randomly, preferably sequentially. For example, the method includes steps (a) and (b), which means that the method may include steps (a) and (b) performed in sequence, and may further include steps (b) and (a) performed in sequence. For example, when mentioning that the method may further include step (c), it means that step (c) may be added to the method in any order, for example, the method may include steps (a), (b), and (c), may also include steps (a), (c), and (b), may also include steps (c), (a), and (b), and so on.

Unless otherwise specified, the "comprising" and "including" mentioned in the present application mean open or closed. For example, the "comprising" and "including" may mean that other components not listed may be included or included, or only listed components may be included or included.

In the present application, the term "or" is inclusive unless otherwise specified. For example, the phrase "A or B" means "A, B, or both A and B". More specifically, any one of the following condition satisfy "A or B": A is true (or exists) and B is false (or does not exist); A is false (or does not exist) and B is true (or exists); or both A and B are true (or exist).

In the present application, the term "cladding layer" refers to a material layer coated on the core. The material layer can completely or partially cover the core. The use of "cladding layer" is only for the convenience of description and is not intended to limit the present invention. Likewise, the term "thickness of the cladding layer" refers to the thickness of the material layer coated on the core in a radial direction of the core.

As used herein, the term "source" refers to a compound that is the source of a certain element. As an example, the types of the "source" include but are not limited to carbonates, sulfates, nitrates, elemental substances, halides, oxides, and hydroxide, and so on.

The inventors of the present application have found in practical work that serious dissolution of the manganese ions occurs during the deep charge and discharge process of the lithium manganese phosphate cathode active material. Although it is attempted in the existing technology to coat lithium manganese phosphate with lithium iron phosphate to reduce interface side reactions, such coating cannot prevent the migration of dissolved manganese into the electrolyte. The dissolved manganese is reduced to metal manganese after migrating to the anode. The generated metal manganese is equivalent to a "catalyst", which can catalyze the decomposition of the SEI film (solid electrolyte interphase film) on the surface of the anode, and a part of the generated by-products is gas, which can easily cause the battery to expand affect the safety of the secondary battery. The other part of the by-products is deposited on the surface of the anode, hindering the passage of lithium ions into and out of the anode, causing the increase in the impedance of the secondary battery and affecting the kinetic performance of the battery. In addition, in order to supplement the lost SEI film, the electrolyte and the active lithium inside the battery are continuously consumed, which has an irreversible impact on the capacity retention of the secondary battery.

After a lot of research, the inventors found that for lithium manganese phosphate cathode active materials, the serious dissolution of manganese ions and high surface reactivity may be caused by the Jahn-Teller effect of $Mn^{3+}$ and the change of $Li^+$ channel size after delithiation. For this reason, the inventors modified lithium manganese phosphate to obtain a cathode active material that can significantly reduce the dissolution of manganese ions and the lattice change rate, and then have excellent cycle performance, high-temperature storage performance, and safety performance.

[Secondary Battery]

Secondary batteries, also known as rechargeable batteries or accumulators, refer to batteries that can be activated by charging the active materials and continue to be used after the battery is discharged.

Typically, a secondary battery includes a cathode piece, an anode piece, a separator, and an electrolyte. During the charging and discharging process of the battery, active ions (such as lithium ions) are repeatedly intercalated and deintercalated between the cathode and the anode. The separator is arranged between the cathode piece and the anode piece, which mainly plays a role in preventing the short circuit of the cathode and the anode, as well as preventing the active ions from passing therethrough. The electrolyte is between the cathode piece and the anode piece, and mainly plays the role of conducting active ions.

An embodiment of the present application provides a secondary battery, comprising a cathode piece and a non-aqueous electrolyte, in which, the cathode piece comprises a cathode active material, and the cathode active material comprises a core and a shell covering the core; the core comprises $Li_{1+x}Mn_{1-y}A_yP_{1-z}R_zO_4$, in which, x=−0.100 to 0.100, y=0.001 to 0.500, z=0.001 to 0.100, and A is one or more selected from the group consisting of Zn, Al, Na, K, Mg, Mo, W, Ti, V, Zr, Fe, Ni, Co, Ga, Sn, Sb, Nb, and Ge, optionally one or more selected from the group consisting of Fe, Ti, V, Ni, Co, and Mg, and R is one or more selected from the group consisting of B, Si, N and S; the shell comprises: a first cladding layer covering the core, and a second cladding layer covering the first cladding layer, in which, the first cladding layer comprises pyrophosphate $MP_2O_7$ and phosphate $XPO_4$, in which, M and X are each independently one or more selected from the group consisting of Li, Fe, Ni, Mg, Co, Cu, Zn, Ti, Ag, Zr, Nb, and Al; and the second cladding layer comprises carbon;

the non-aqueous electrolyte includes a first lithium salt and a first additive, and the first lithium salt includes one or more selected from the group consisting of $LiN(C_mF_{2m+1}SO_2)(C_nF_{2n+1}SO_2)$ and $Li(FSO_2)_2N$, m and n represent positive integers;

the first additive includes one or more of the compounds represented by Formula 1,

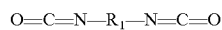
　　　　　　　　　　　　　　　　　　　　　Formula 1 in which, $R_1$ represents any one of a $C_2$-$C_{10}$ alkylene, a $C_2$-$C_{10}$ heteroalkylene, a $C_6$-$C_{18}$ arylene, a $C_2$-$C_{18}$ heteroarylene, a $C_3$-$C_{18}$ alicyclylene, a $C_3$-$C_{18}$ heteroalicyclylene, which are substituted by one or more $R_a$ or are unsubstituted, and $R_a$ comprises one or more selected from a halogen atom, —CN, —NCO, —OH, —COOH, —SOOH, a —COOR$_b$, a $C_2$-$C_{10}$ alkyl, a $C_2$-$C_{10}$ alkenyl, a $C_2$-$C_{10}$ alkynyl, a $C_2$-$C_{10}$ oxaalkyl, and $R_b$ is any one selected from $C_1$-$C_{10}$ alkyls.

The cathode piece generally includes a cathode current collector and a cathode film layer arranged on at least one surface of the cathode current collector, and the cathode film layer includes a cathode active material.

As an example, the cathode current collector has two opposing surfaces in its own thickness direction, and the cathode film layer is disposed on any one or both of the two opposing surfaces of the cathode current collector.

In some embodiments, a metal foil or a composite current collector can be used as the cathode current collector. For example, an aluminum foil can be used as the metal foil. The composite current collector may include a polymer material substrate and a metal layer formed on at least one surface of the polymer material substrate. The composite current collector can be formed by forming a metal material (aluminum, aluminum alloy, nickel, nickel alloy, titanium, titanium alloy, silver, silver alloy, and so on) on the polymer material substrate (such as polypropylene (PP), poly(ethylene terephthalate) (PET), polybutylene terephthalate (PBT), polystyrene (PS), polyethylene (PE), and other substrates).

The cathode active material of the present application is obtained by element doping in the compound $LiMnPO_4$, in which, A, B, C, and D represent elements doped at the Li site, the Mn site, the P site, and O site of the compound $LiMnPO_4$, respectively. Without wishing to be bound by theory, it is believed that the performance improvement of lithium manganese phosphate is related to reducing the lattice change rate of lithium manganese phosphate and reducing surface activity during lithium deintercalation. Reducing the lattice change rate can reduce the lattice constant difference between the two phases at the grain boundary, reduce the interfacial stress, and enhance the $Li^+$ transport capacity at the interface, thereby improving the rate performance of the cathode active material. However, high surface activity can easily lead to serious interface side reactions, and aggravate gas production, electrolyte consumption, and interface damage, thereby affecting battery cycle performance. In the present application, the lattice change rate is reduced by Li-site and Mn-site doping. Mn-site doping can also effectively reduce surface activity, thereby inhibiting the dissolution of manganese ions and the interface side reaction between the cathode active material and the electrolyte. P-site doping makes the change rate of the Mn—O bond length faster, lowers the small polaron migration barrier of the material, and thus being beneficial to the electronic conductivity. O-site doping has good effect on reducing the side reactions at the interface. The doping of P site and O site also affects the dissolution of manganese ions and kinetic performance of antisite defects. Therefore, doping reduces the concentration of antisite defects in the material, improves the kinetic performance and gram capacity of the material, and can also change the morphology of the particles, thereby increasing the compaction density. The applicant unexpectedly found that by doping the Li site, Mn site, P site, and O site of the compound $LiMnPO_4$ with a specific element at a specific amount of the application at the same time, a significantly improved rate performance can be obtained, while significantly reducing dissolution of Mn and Mn-site doping elements results in significantly improved cycle performance and/or high-temperature stability, and the gram capacity and compacted density of the material can also be improved.

In addition, the non-aqueous electrolyte includes the first lithium salt as the main lithium salt, due to its excellent thermal stability and hydrolysis resistance, the first lithium salt can effectively reduce the acidity of the electrolyte, reduce the dissolution of manganese ions, and improve high-temperature cycle, and storage performance. The isocyanate-based compound represented by Formula 1 is introduced into the electrolyte, and can react with trace water in the battery to form —NHCOOH, prevent trace water from interacting with non-aqueous electrolyte to produce HF, further reduce the acidity of the electrolyte and reduce the dissolution of manganese ions, thereby improving high-temperature cycle and storage performance. Moreover, the isocyanate-based compound represented by Formula 1 can also form a uniform SEI film on the anode, reduce the reduction of dissolved Mn at the anode, and further improve the high-temperature cycle and storage performance.

In some embodiments, the non-aqueous electrolyte includes a first lithium salt and a first additive, and the first lithium salt exists as a main lithium salt. $LiN(C_mF_{2m+1}SO_2)(C_nF_{2m+1}SO_2)$ in the first lithium salt may be selected from any corresponding specific substance in the existing technology. In some embodiments, m and n each independently represent 1, 2, or 3, to provide better thermal stability. For example, the first lithium salt is any one or more selected from the group consisting of $LiN(C_mF_{2m+1}SO_2)(C_nF_{2n+1}SO_2)$ and $Li(FSO_2)_2N$, for example, the first lithium salt may be selected from the following substances: (fluorosulfonimide) (trifluoromethanesulfonimide) lithium $Li(FSO_2)(CF_3SO_2)N$, bis(trifluoromethanesulfonimide) lithium $(LiN(CF_3SO_2)_2)$, bis(pentafluoroethanesulfonimide) lithium $(LiN(C_2F_5SO_2)_2)$, (trifluoromethanesulfonimide) (pentafluoroethanesulfonimide) lithium $(LiN(CF_3SO_2)(C_2F_5SO_2))$, (trifluoromethanesulfonimide) (heptafluoropropanesulfonimide) lithium $(LiN(CF_3SO_2)(C_3F_7SO_2))$, (trifluoromethanesulfonimide) (nonafluorobutanesulfonimide) lithium $(LiN(CF_3SO_2)(C_4F_9SO_2))$, (pentafluoroethanesulfonimide) (heptafluoropropanesulfonimide) lithium $LiN(C_2F_5SO_2)(C_3F_7SO_2)$, and $Li(FSO_2)_2N$.

The isocyanate compound shown in Formula 1 in the present application may be selected from the isocyanate compounds commonly used in electrolytes in the existing technology. In some embodiments, $R_1$ represents any one of a $C_2$-$C_{10}$ alkylene, a $C_2$-$C_{10}$ oxaalkylene, a $C_2$-$C_{10}$ azaalkylene, phenylene, naphthylene, anthrylene, cyclobutylene, cyclopentylene, cyclohexylene, biphenylene, methylenediphenylene, which are substituted by one or more $R_a$ or are unsubstituted; optionally, the $R_1$ represents any one of a $C_2$-$C_6$ alkylene, phenylene, naphthylene, anthracene, cyclobutylene, cyclopentylene, cyclohexylene, biphenylene, and methylenediphenylene, which are substituted by one or more $R_a$ or are unsubstituted; and/or, the $R_a$ comprises one or more selected from halogen atoms, —CN, $C_2$-$C_3$ alkyl; and/or, a number of $R_a$ in the compound represented by the Formula 1 is 0, 1, 2, 3, or 4.

Optionally, the first additive includes one or more of the following compounds:

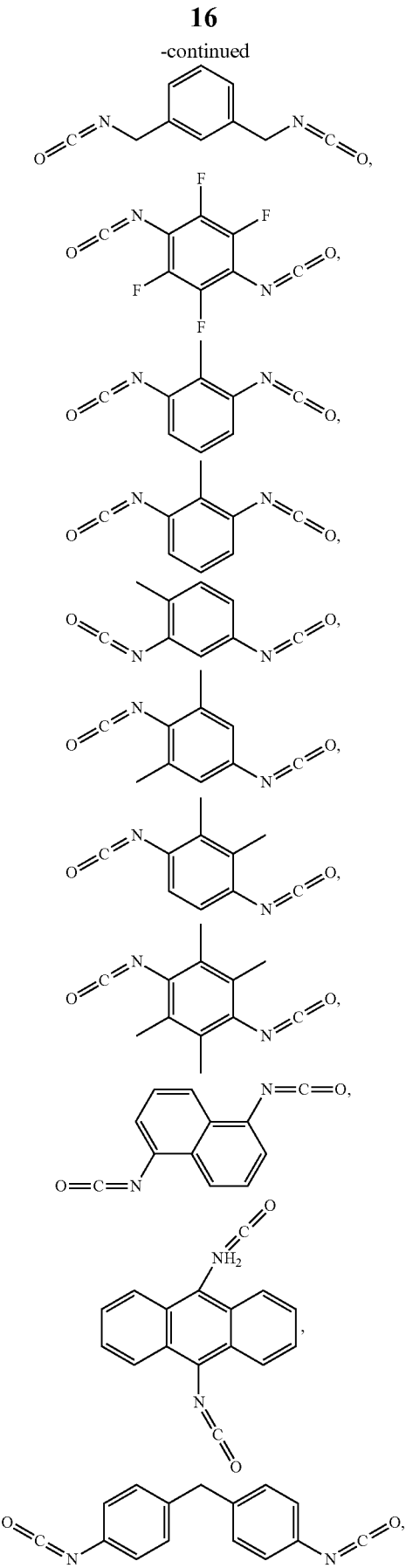

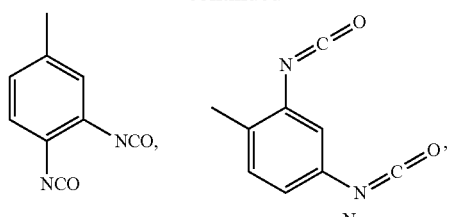
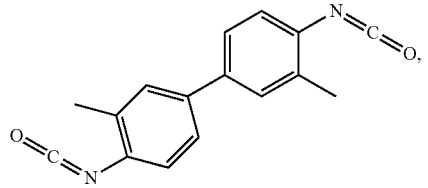
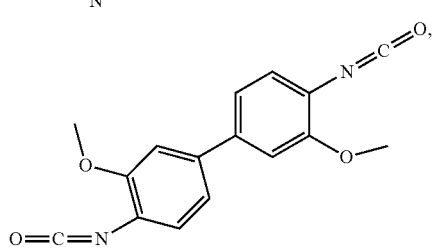
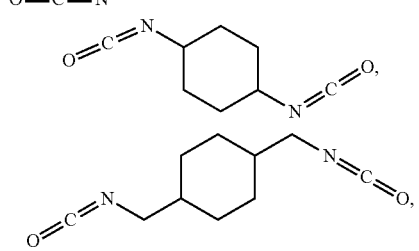
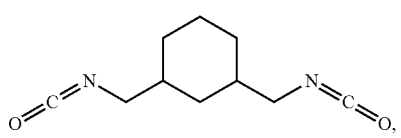
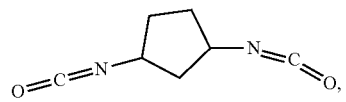
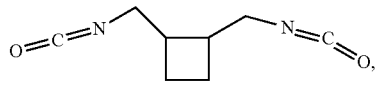
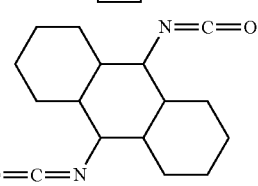
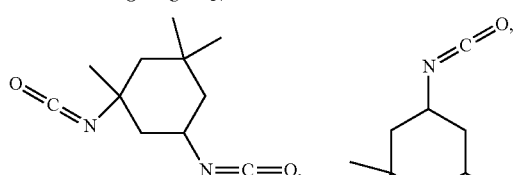
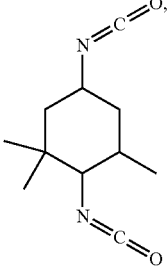

The compounds have good dispersion and solubility properties in the solvent of the non-aqueous electrolyte, and can fully react with trace water in the battery to form —NHCOOH, prevent trace water from interacting with non-aqueous electrolyte to produce HF, further reduce the acidity of the electrolyte and reduce the dissolution of manganese ions, thereby improving high-temperature cycle and storage performance. In addition, the isocyanate-based compounds are more likely to form a uniform SEI film on the anode, which is more conducive to reducing the reduction of dissolved Mn on the anode, and further improving high-temperature cycle and storage performance.

In some embodiments of the present application, when the first lithium salt is any one selected from $LiN(CF_3SO_2)(FSO_2)$, $Li(CF_3SO_2)_2N$, and $LiN(C_4F_9SO_2)(FSO_2)$, the first additive is any one selected from the following compounds:

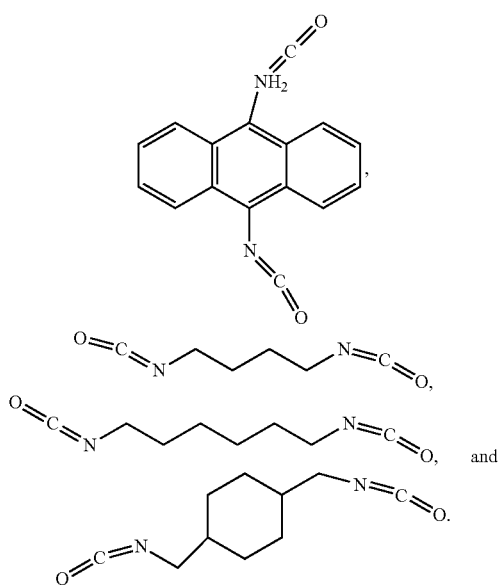

In this way, the advantages of the first lithium salt and the first additive are fully utilized and the acidity of the electrolyte and the dissolution of manganese ions are significantly reduced, and the high-temperature cycle and storage performance of the lithium-ion battery are significantly improved.

Although adopting the first lithium salt as the main lithium salt of the non-aqueous electrolyte can effectively improve the high-temperature cycle and storage performance of the secondary battery, the substance will corrode the lithium salt under certain conditions, such as when the operating voltage of the lithium-ion battery is >4.2V, the problem of aluminum foil corrosion occurs. A possible mechanism is that after the original oxide film on the surface of the aluminum foil is destroyed in the electrolyte, aluminum having higher activity is exposed, and the aluminum is oxidized to produce $Al^{3+}$ ions, then FSI- or TFSI- in the 1 electrolyte combines with $Al^{3+}$ to form soluble $Al(FSI)_3$ or $Al(TFSI)_3$, and the dissolution of $Al(FSI)_3$ or $Al(TFSI)_3$ causes aluminum corrosion. Therefore, in order to alleviate the aluminum foil corrosion problem caused by the first lithium salt under high operating voltage, in some embodiments, based on the total weight of the non-aqueous electrolyte, the content of the first lithium salt is W1 wt. %, and W1 is between 0.1 and 48, which can be The selection range is between 5 and 20.

On the basis of controlling the content of the first lithium salt, in some embodiments, the lithium salt in the non-aqueous electrolyte can be supplemented by adding a second lithium salt, that is, the non-aqueous electrolyte further includes a second lithium salt, and the second lithium salt includes one or more selected from lithium difluorophosphate, lithium difluorodioxalate phosphate, lithium difluorooxalate borate, lithium bisoxalate borate, $LiPF_6$, and $LiBF_4$. The second lithium salt is added to the non-aqueous electrolyte as a lithium salt-type additive, which will be preferentially decomposed on a surface of an aluminum foil, and the insoluble precipitate formed by the combination of a decomposition product and the aluminum ion adheres to the surface of the aluminum foil, thereby forming a passivation film, which prevents the direct contact between the aluminum foil and the electrolyte, protects the aluminum foil, and in turn cooperates with the first lithium salt to improve high-temperature cycle and storage performance.

However, too much lithium salt-type additive will increase the impedance of the cathode and the anode, resulting in abnormal lithium-ion battery capacity and poor rate performance. In some embodiments, based on a total weight of the non-aqueous electrolyte, a content of the second lithium salt is W3 wt. %, W3 is between 0.01 and 20, optionally between 0.1 and 10 or between 0.3 and 5. When a weight ratio of the second lithium salt in the electrolyte is within the above range, not only is the corrosion of the aluminum foil inhibited, but also the high-temperature cycle and storage performance of the lithium-ion battery are improved, while not deteriorating the capacity and rate performance of the lithium-ion battery.

Although the first additive can form a uniform SEI film on the anode, reduce the reduction of dissolved Mn at the anode, and further improve the high-temperature cycle and storage performance; too much isocyanate-based compounds will increase the impedance of the anode, resulting in abnormal lithium-ion battery capacity and poor rate performance. Optionally, a content of the first additive is W2 wt. %, W2 is between 0.01 and 20, optionally between 0.1 and 10 or between 0.3 and 5, when a weight ratio of the first additive in the electrolyte is within the above range, not only is the acidity of the electrolyte lowered and the manganese ion dissolution reduced, but also the deterioration of the impedance of the anode is avoided, thereby improving the high-temperature cycle and storage performance of the lithium-ion battery, while not affecting the capacity and rate performance of the lithium-ion battery.

In some embodiments, the W2/W1 is defined as M, and M is between 0.001 and 3, optionally between 0.005 and 0.5. (W2+W3)/W1 is defined as N, and N is 0.01 to 2, optionally between 0.02 and 1.

When W2/W1 and (W2+W3)/W1 are within the above ranges, the three can play a better synergistic effect, ensuring that the acidity of the system is low, the dissolution of manganese ions is reduced, and the high-temperature cycle and storage performance of lithium ions are excellent; in addition, the corrosion of aluminum foil is effectively inhibited, the high-temperature cycle and storage performance of lithium-ion batteries are improved, while not deteriorating the capacity and rate performance of the lithium-ion battery.

In some embodiments, the non-aqueous electrolyte further includes a second additive, and the second additive includes one or more selected from the group consisting of a cyclic carbonate compound containing an unsaturated bond, a halogen-substituted saturated cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphorous acid ester compound, a phosphate ester compound, a borate ester compound. Those skilled in the art can select the corresponding second additive from the above substances according to actual needs, and the amount of the second additive in the non-aqueous electrolyte can also refer to the existing technology, which will not be repeated in the present application.

In some embodiments, the non-aqueous electrolyte further includes an organic solvent. The type of the organic solvent is not particularly limited and can be selected according to actual needs. Specifically, the organic solvent includes one or more of a cyclic carbonate compound, a chain carbonate compound, and a carboxylate compound. Operationally, the organic solvent includes one or more of dimethyl carbonate, diethyl carbonate, dipropyl carbonate, ethyl methyl carbonate, methyl propyl carbonate, ethylene propyl carbonate, ethylene carbonate, propylene carbonate, butylene carbonate, γ-butyrolactone, methyl formate, ethyl formate, methyl acetate, ethyl acetate, propyl acetate, methyl propionate, ethyl propionate, butyl propionate, tetrahydrofuran.

In some embodiments, A, C, and D of the cathode active material are each independently any element within the above respective ranges, and the B is at least two elements. This makes it possible to more easily and accurately control the composition of the cathode active material.

In some embodiments, based on a weight of the core, the coating amount of the first cladding layer is C1 wt. %, where C1 is greater than 0 and less than or equal to 7, optionally 4 to 5.6. When the coating amount of the first cladding layer is within the above range, the dissolution of manganese ions can be further suppressed, and meanwhile the transport of lithium ions can be further promoted, in addition, the following situations can be effectively avoided: if the coating amount of the first cladding layer is too small, pyrophosphate may have insufficient inhibitory effect on the dissolution of manganese ions, and the improvement of lithium ion transport performance may also not significant; and if the coating amount of the first cladding layer is too large, the cladding layer may be too thick, which may increase the battery impedance and affect the kinetic performance of the battery.

In some embodiments, based on the weight of the core, the coating amount of the second cladding layer is C2 wt. %, and C2 is greater than 0 and less than or equal to 6, optionally 3 to 5. On the one hand, the carbon-containing layer as the second cladding layer can play a "barrier" function to avoid direct contact between the cathode active material and the electrolyte, thereby reducing the corrosion of the active material by the electrolyte and improving the safety performance of the battery at high temperatures. On the other hand, the second cladding layer has strong electrical conductivity, which can reduce the internal resistance of the battery, thereby improving the kinetic performance of the battery. However, since the gram capacity of the carbon material is low, when the amount of the second cladding layer is too large, the gram capacity of the entire cathode active material may be reduced. Therefore, when the coating amount of the second cladding layer is within the above range, the kinetic performance and safety performance of the battery can be further improved without sacrificing the gram capacity of the cathode active material.

In some embodiments, the ratio of (W1+W2)/(C1+C2) is defined as Q, and Q is between 0.1 and 10 (such as 0.1, 0.5, 1, 2, 3, 4, 5, 6, 7, 8, 9, or 10), and may be optionally between 0.5 and 5, when C is less than the above range, the lithium salt and the additive are insufficient to reduce the acidity of the electrolyte, inhibitory effect on the dissolution of manganese ions are limited, and the high-temperature cycle and storage performance cannot be significantly improved; and when C is greater than the above range, the film-forming impedance is too large, and the capacity and rate performance of the lithium-ion battery will be affected and are difficult to be effectively improved.

In some embodiments, optionally, a weight ratio of pyrophosphate to phosphate in the first cladding layer is between 1:3 and 3:1, optionally between 1:3 and 1:1.

The proper weight ratio of pyrophosphate to phosphate is helpful for the two to fully play the synergistic effect, and can effectively avoid the following situations: in case of too much pyrophosphate and too little phosphate, an increase in battery impedance may be resulted; and in case of too much phosphate and too little pyrophosphate, the effect of inhibiting the dissolution of manganese ions is not significant.

In some embodiments, optionally, an interplanar spacing of phosphate in the first cladding layer is 0.345-0.358 nm, and an included angle of a crystal direction (111) is 24.25°-26.45°; and an interplanar spacing of pyrophosphate in the first cladding layer is 0.293-0.326 nm, and the included angle of the crystal direction (111) is 26.41°-32.57°.

When the interplanar spacing and the included angle of the crystal direction (111) of phosphate and pyrophosphate in the first cladding layer are within the above range, the impurity phase in the cladding layer can be more effectively avoided, thereby further improving the gram capacity of the material, further improving the cycle performance and rate performance of the secondary battery.

In some embodiments, optionally, a ratio of y to 1−y in the core is between 1:10 and 10:1, optionally between 1:4 and 1:1. Here y represents a sum of stoichiometric numbers of Mn-site doping elements. When the above conditions are met, the energy density and cycle performance of the cathode active material can be further improved.

In some embodiments, optionally, a ratio of z to 1−z in the core is between 1:9 and 1:999, optionally between 1:499 and 1:249. Here y represents a sum of the stoichiometric numbers of the P-site doping elements. When the above conditions are met, the energy density and cycle performance of the cathode active material can be further improved.

In some embodiments, optionally, crystallinities of pyrophosphate and phosphate are independently between 10% and 100%, optionally between 50% and 100%.

In the first cladding layer of the lithium manganese phosphate cathode active material in the present application, pyrophosphate and phosphate with a certain degree of crystallinity are beneficial to keep the structure of the first cladding layer stable and reduce lattice defects. On the one hand, this is beneficial for pyrophosphate to fully play the effect of hindering the dissolution of manganese ions. On the other hand, it is also beneficial to phosphate to reduce the content of lithium impurities on the surface and the valence state of oxygen on the surface, thereby reducing the interface side reaction between the cathode material and the electrolyte, reducing the consumption of electrolyte, and improving the cycle performance and the safety performance of the secondary battery.

It should be noted that, in the present application, the crystallinities of pyrophosphate and phosphate can be adjusted, for example, by adjusting the process conditions of the sintering process, such as sintering temperature, sintering time, and the like. The crystallinities of pyrophosphate and phosphate salts can be measured by methods known in the art, such as by X-ray diffraction, densitometry, infrared spectroscopy, differential scanning calorimetry, and nuclear magnetic resonance absorption.

In some embodiments, optionally, the A is at least two selected from Fe, Ti, V, Ni, Co, and Mg.

Simultaneously doping two or more of the above elements on the manganese site of the lithium manganese phosphate cathode active material is beneficial to enhance the doping effect, on the one hand, the lattice change rate is further reduced, thereby inhibiting the dissolution of manganese and reducing the electrolyte and active lithium; and on the other hand, it is also beneficial to further reduce the surface oxygen activity and reduce the interface side reaction between the cathode active material and the electrolyte, thereby improving the cycle performance and high temperature storage performance of the battery.

In some embodiments, optionally, the concentration of Li/Mn antisite defect in the cathode active material is less than 4%, optionally less than 2%.

In the cathode active material of the present application, the Li/Mn antisite defect refers to the exchange of $Li^+$ and $Mn^{2+}$ positions in the $LiMnPO_4$ lattice. Since the $Li^+$ transport channel is a one-dimensional channel, it is difficult for $Mn^{2+}$ to migrate in the $Li^+$ transport channel. Therefore, the $Mn^{2+}$ of the antisite defect will hinder the transport of $Li^+$. The gram capacity and rate performance of $LiMnPO_4$ can be improved by controlling the concentration of Li/Mn antisite defect at a low level. In the present application, the concentration of the antisite defect can be measured, for example, according to JIS K 0131-1996.

In some embodiments, optionally, the lattice change rate of the cathode active material is less than 6%, optionally less than 4%.

The lithium deintercalation process of $LiMnPO_4$ is a two-phase reaction. The interfacial stress of the two phases is determined by the lattice change rate. The smaller the lattice change rate, the smaller the interfacial stress and the easier $Li^+$ transport. Therefore, the reduction of the lattice change rate of the core will be beneficial to enhance the $Li^+$ transport ability, thereby improving the rate performance of the secondary battery.

In some embodiments, optionally, a button battery average discharge voltage of the cathode active material is above 3.5 V, and the discharge gram capacity is above 140 mAh/g; optionally, the average discharge voltage is above 3.6 V, and the discharge gram capacity is above 145 mAh/g.

Although the average discharge voltage of undoped $LiMnPO_4$ is above 4.0V, the discharge gram capacity thereof is low, usually less than 120 mAh/g, so the energy density is low. By doping to adjust the lattice change rate, the discharge gram capacity can be greatly increased, and the overall energy density increases significantly in the case of a slight drop in the average discharge voltage.

In some embodiments, optionally, the surface oxygen valence state of the cathode active material is below −1.88, optionally between −1.98 and −1.88.

This is because the higher the valence state of oxygen in the compound is, the stronger the ability thereof to obtain electrons is, that is, the stronger the oxidation is. However, in the first cathode active material of the present application, by controlling the surface valence state of oxygen at a lower level, the reactivity of the surface of the cathode material can be reduced, and the interface side reaction between the cathode material and the electrolyte can be further reduced, thereby further improving the cycle performance and high temperature storage performance of the secondary battery.

In some embodiments, optionally, the cathode active material has a compacted density at 3 tons (T) of higher than 2.0 $g/cm^3$, optionally higher than 2.2 $g/cm^3$.

The higher the compacted density of the first cathode active material is, that is, the greater the weight of the active material per unit volume is, it is more conducive to increasing the volumetric energy density of the secondary battery. In the present application, the compacted density can be measured, for example, according to GB/T 24533-2009.

The cathode active material used in the secondary battery of the present application is prepared by the following preparation method, and the preparation method includes the following steps:

providing a core material comprising $Li_{1+x}Mn_{1-y}A_yP_{1-z}R_zO_4$; providing a $MP_2O_7$ powder and a $XPO_4$ suspension containing a source of carbon; adding the core material, the $MP_2O_7$ powder to the $XPO_4$ suspension containing the source of carbon for mixing, and sintering a resulting mixture to obtain the cathode active material.

In some embodiments, the step of providing the core material includes the following steps: step (1): mixing and stirring a source of manganese, a source of element A, and an acid in a container to obtain manganese salt particles doped with the element A; step (2): mixing the manganese salt particles doped with the element A with a source of lithium, a source of phosphorus, and a source of element R in a solvent to obtain a slurry, sintering the slurry under the protection of an inert gas atmosphere to obtain a lithium manganese phosphate doped with the element A and the element R, in which, the lithium manganese phosphate doped with the element A and the element R is $Li_{1+x}Mn_{1-y}A_yP_{1-z}R_zO_4$, where x=−0.100-0.100, y=0.001-0.500, z=0.001-0.100, A is one or more selected from Zn, Al, Na, K, Mg, Mo, W, Ti, V, Zr, Fe, Ni, Co, Ga, Sn, Sb, Nb, and Ge, and optionally one or more selected from Fe, Ti, V, Ni, Co, and Mg, and R is one or more selected from B, Si, N, and S.

Preferably, the above step (1) is carried out at a temperature of 20-120° C., optionally 25-80° C.; and/or, the stirring in step (1) is carried out at 500-700 rpm for 60-420 mins, which can be preferably 120-360 mins.

In some embodiments, the source of the element A is one or more selected from an elemental substance, a sulfate, a halide, nitrate, an organic acid salt, an oxide, or a hydroxide of the element A; and/or, the source of the element R is one or more selected from a elemental substance, a sulfate, a halide, a nitrate, an organic acid salt, an oxide, or a hydroxide, and an inorganic acid of the element R.

In some embodiments, the $MP_2O_7$ powder is prepared by the following method: adding the source of the element M and the source of phosphorus to a solvent to obtain a mixture, adjusting a pH value of the mixture to 4-6, stirring the mixture for complete reaction, and then drying and sintering resulting mixture to obtain the $MP_2O_7$ powder, in which, M is one or more selected from Li, Fe, Ni, Mg, Co, Cu, Zn, Ti, Ag, Zr, Nb, and Al. Preferably, the drying step includes drying at 100-300° C., optionally 150-200° C. for 4-8 hrs; the sintering step includes sintering under an inert gas atmosphere at 500-800° C., optionally 650-800° C., for 4-10 hrs.

In some embodiments, a sintering temperature in the coating step is 500-800° C., and the sintering time is 4-10 hrs.

In some embodiments, the cathode film layer may further include other cathode active materials known in the art for secondary batteries. As an example, the cathode active material may include at least one of the following materials: olivine-structured lithium-containing phosphate, lithium transition metal oxide, and their respective modified compounds. However, the present application is not limited to these materials, and other conventional materials suitable for cathode active materials of the secondary batteries can also be used. These cathode active materials may be used alone or in combination of two or more. Examples of lithium transition metal oxides may include, but are not limited to, at least one of lithium nickel oxide (such as $LiNiO_2$), lithium manganese oxide (such as $LiMnO_2$, $LiMn_2O_4$), lithium nickel cobalt oxide, lithium manganese cobalt oxide, lithium nickel manganese oxide, and modified compounds thereof. Examples of the olivine-structured lithium-containing phosphate may include, but are not limited to, at least one of lithium iron phosphate (such as $LiFePO_4$, which may also be abbreviated as LFP), a composite material of lithium iron phosphate and carbon, lithium manganese phosphate (such as LiMnPO$_4$), a composite material of lithium manganese phosphate and carbon, lithium iron manganese phosphate, and a composite material of lithium iron manganese phosphate and carbon.

In some embodiments, the cathode film layer may optionally include a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the cathode film layer may also optionally include a conductive agent. As an example, the conductive agent may include at least one of a superconducting carbon, an acetylene black, a carbon black, a Ketjen black, carbon dots, carbon nanotubes, graphene, and carbon nanofibers.

In some embodiments, the cathode piece can be prepared as follows: dispersing the components for preparing the cathode piece, such as the cathode active material, the conductive agent, the binder, and any other components, in a solvent (such as N-methylpyrrolidone) to form a cathode slurry; coating the cathode slurry on the cathode current collector; and performing drying, cold pressing, and other processes, to obtain the cathode piece.

[Anode Piece]

The anode piece includes an anode current collector and an anode film layer arranged on at least one surface of the anode current collector, and the anode film layer includes an anode active material.

As an example, the anode current collector has two opposing surfaces in its own thickness direction, and the anode film layer is arranged on any one or both of the two opposing surfaces of the anode current collector.

In some embodiments, a metal foil or a composite current collector can be used as the anode current collector. For example, a copper foil can be used as the metal foil. The composite current collector may include a polymer material substrate and a metal layer formed on at least one surface of polymer material substrate. The composite current collectors can be formed by forming a metal material (copper, copper alloy, nickel, nickel alloy, titanium, titanium alloy, silver, and silver alloy, and so on) on the polymer material substrate (such as polypropylene (PP), poly(ethylene terephthalate) (PET), polybutylene terephthalate (PBT), polystyrene (PS), polyethylene (PE), and other substrates).

In some embodiments, the anode active material can be an anode active material known in the art of batteries. As an example, the anode active material may include at least one of the following materials: artificial graphite, natural graphite, soft carbon, hard carbon, silicon-based material, tin-based material, lithium titanate, and the like. The silicon-based material may be at least one selected from elemental silicon, a silicon-oxygen compound, a silicon-carbon composite, a silicon-nitrogen composite, and a silicon alloy. The tin-based material can be at least one selected from of elemental tin, a tin oxide, and a tin alloy. However, the present application is not limited to these materials, and other conventional materials suitable for the anode active materials of the batteries can also be used. These anode active materials may be used alone or in combination of two or more.

In some embodiments, the anode film layer may further optionally include a binder. As an example, the binder may be at least one selected from a styrene-butadiene rubber (SBR), a polyacrylic acid (PAA), a sodium polyacrylate (PAAS), a polyacrylamide (PAM), a polyvinyl alcohol (PVA), a sodium alginate (SA), a polymethacrylic acid (PMAA), and a carboxymethyl chitosan (CMCS).

In some embodiments, the anode film layer may also optionally include a conductive agent. As an example, the conductive agent may include at least one of a superconducting carbon, an acetylene black, a carbon black, a Ketjen black, carbon dots, carbon nanotubes, graphene, and carbon nanofibers.

In some embodiments, the anode film layer may optionally include other additives, such as a thickener (such as, a sodium carboxymethylcellulose (CMC-Na)) and the like.

In some embodiments, the anode piece can be prepared as follows: dispersing the components for preparing the anode piece, such as the anode active material, the conductive agent, the binder, and any other components, in a solvent (such as a deionized water) to form an anode slurry; coating the anode slurry on the anode current collector, and performing drying, cold pressing, and other processes, to obtain the anode piece.

[Separator]

In some embodiments, a separator is further included in the secondary battery. The present application has no particular limitation on the type of the separator, and any known separator in a porous structure having good chemical stability and mechanical stability can be selected.

In some embodiments, the material for the separator can be at least one selected from a glass fiber, a non-woven fabric, a polyethylene, a polypropylene, and a polyvinylidene fluoride. The separator can be a single-layer film or a multi-layer composite film, which is not particularly limited herein. When the separator is a multilayer composite film, the materials of each layer may be the same or different, which is not particularly limited herein.

In some embodiments, the cathode piece, the anode piece, and the separator can be made into an electrode assembly through a winding process or a lamination process.

In some embodiments, the secondary battery may include an outer package. The outer package can be used to package the electrode assembly and THE electrolyte.

In some embodiments, the outer packaging of the secondary battery may be a hard case, such as a hard plastic case, aluminum case, steel case, and the like. The outer packaging of the secondary battery may also be a soft case, such as a bag-type soft case. The material of the soft case may be plastic, and examples of the plastic include a polypropylene, a polybutylene terephthalate, a polybutylene succinate, and the like.

Figure 2:
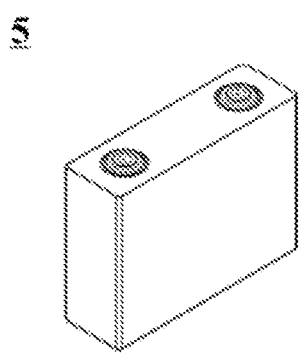
FIG. 2 is a schematic diagram of a secondary battery according to an embodiment of the present application.

The present application has no special limitation on the shape of the secondary battery, which may be cylindrical, square, or any other shape. For example, FIG. 2 shows a square-shaped secondary battery 5 as an example.

Figure 3:
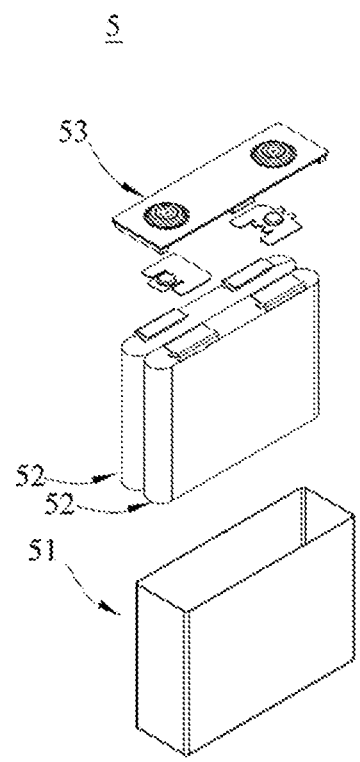
FIG. 3 is an exploded view of the secondary battery according to an embodiment of the present application shown in FIG. 2.

In some embodiments, referring to FIG. 3, the outer package may include a housing 51 and a cover 53. The housing 51 may include a bottom plate and a side plate connected to the bottom plate, and the bottom plate and the side plates enclose to form an accommodating cavity. The housing 51 has an opening communicating with the accommodating cavity, and the cover 53 can cover the opening to enclose the accommodating cavity. The cathode piece, the anode piece, and the separator can be formed into an electrode assembly 52 through a winding process or a lamination process. The electrode assembly 52 is packaged in the accommodating cavity. Electrolyte is infiltrated in the electrode assembly 52. The number of electrode assemblies

52 contained in the secondary battery 5 can be one or more, which may be selected by those skilled in the art according to specific actual needs.

In some embodiments, the secondary battery can be assembled into a battery module, and the number of secondary batteries contained in the battery module can be one or more, and the specific number can be selected by those skilled in the art according to the application and capacity of the battery module.

Figure 4:
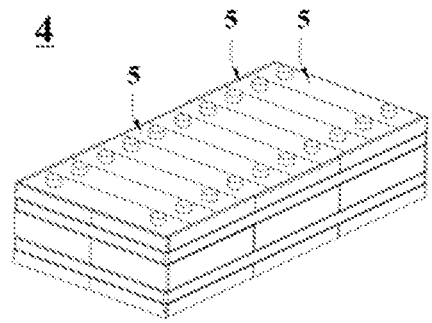
FIG. 4 is a schematic diagram of a battery module according to an embodiment of the present application.

FIG. 4 is a battery module 4 as an example. Referring to FIG. 4, in the battery module 4, a plurality of secondary batteries 5 may be arranged in sequence along a length direction of the battery module 4. It can be understood any other arrangement manners can also be adopted. Furthermore, the plurality of secondary batteries 5 may be fixed by fasteners.

Optionally, the battery module 4 may further include a case having an accommodation space, in which a plurality of secondary batteries 5 are accommodated.

In some embodiments, the battery modules can also be assembled into a battery pack, and the number of battery modules contained in the battery pack can be one or more, and the specific number can be selected by those skilled in the art according to the application and capacity of the battery pack.

Figure 5:
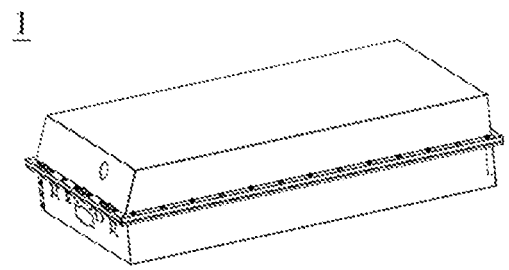
FIG. 5 is a schematic diagram of a battery pack according to an embodiment of the present application.
Figure 6:
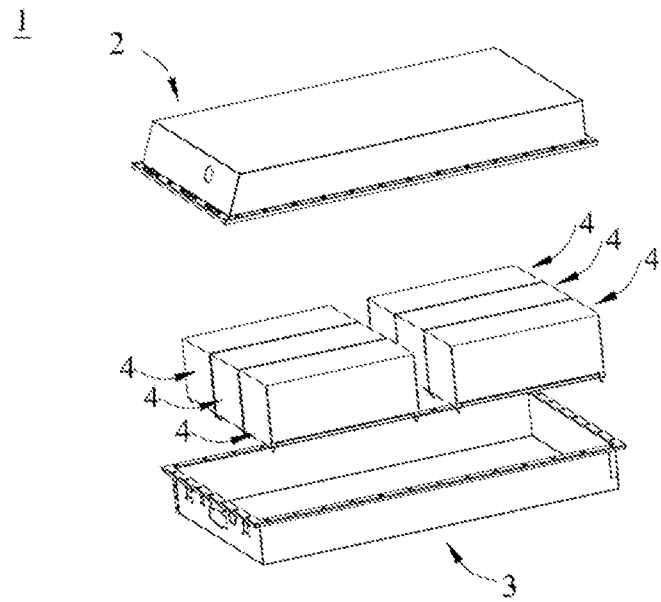
FIG. 6 is an exploded view of the battery pack according to an embodiment of the present application shown in FIG. 5.

FIGS. 5-6 show a battery pack 1 as an example. Referring to FIGS. 5-6, the battery pack 1 may include a battery case and a plurality of battery modules 4 disposed in the battery case. The battery case includes an upper case 2 and a lower case 3, the upper case 2 can cover the lower case 3 and form an enclosed space for accommodating the battery modules 4. The plurality of battery modules 4 can be arranged in the battery case in any manner.

In addition, the present application also provides an electric device, which includes at least one of the secondary battery, the battery module, or the battery pack provided in the present application. The secondary battery, the battery module, or the battery pack can be used as a power source of the electric device, and can also be used as an energy storage unit of the electric device. The electric devices may include mobile devices (such as mobile phones, laptops, and the like), electric vehicles (such as pure electric vehicles, hybrid electric vehicles, plug-in hybrid electric vehicles, electric bicycles, electric scooters, electric golf carts, and the like), electric trucks, and the like), electric trains, ships and satellites, energy storage systems, and the like, but not limited thereto.

The secondary battery, the battery module, or the battery pack can be selected as the electric device according to the use requirements.

Figure 7:
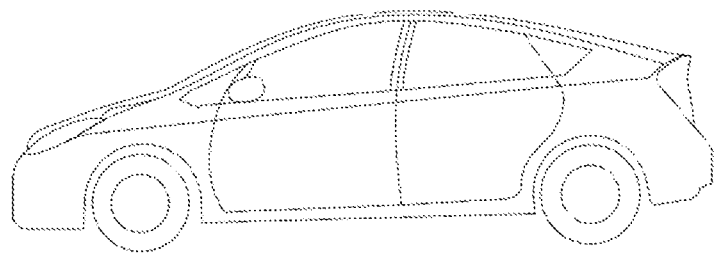
FIG. 7 is a schematic diagram of an electric device in which a secondary battery is used as a power source according to an embodiment of the present application.

FIG. 7 is an example of an electric device. The electric device is a pure electric vehicle, a hybrid electric vehicle, or a plug-in hybrid electric vehicle. In order to meet the high power and high energy density requirements of the electric device for the secondary battery, a battery pack, or a battery module may be used.

EXAMPLES

Hereinafter, examples of the present application will be described. The embodiments described below are exemplary and are only used for explaining the present application, and should not be construed as limiting the present application. If no specific technique or condition is indicated in the examples, it shall be carried out according to the technique or condition described in the literature in this field or according to the product specification. The reagents or instruments used, if not indicated by the manufacturer, are all commercially available conventional products.

The first additive is selected from the following compounds:

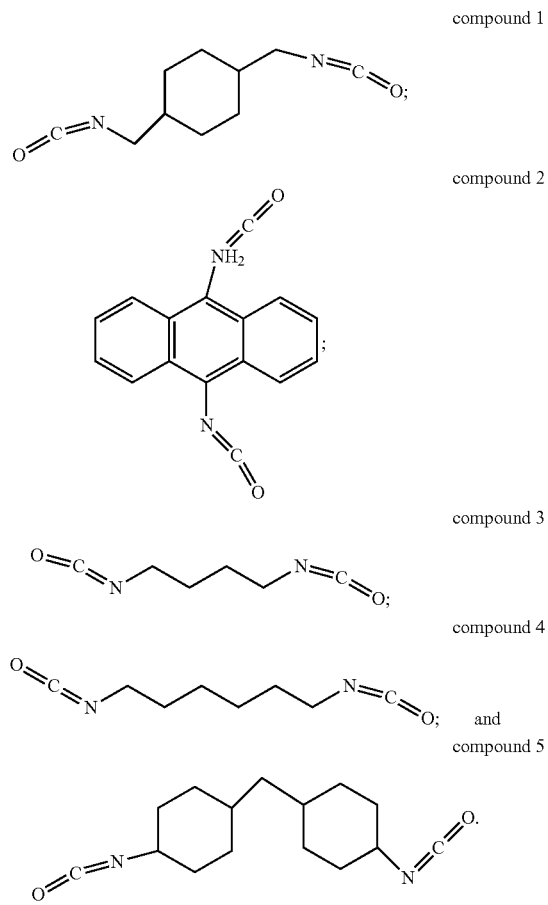

Example 1-1

[Preparation of Double-Layer Coated Lithium Manganese Phosphate Cathode Active Material]
(1) Preparation of Co-Doped Lithium Manganese Phosphate Core Preparation of manganese oxalate co-doped with Fe, Co, and V: 689.5 g of manganese carbonate (calculated as $MnCO_3$, the same below), 455.2 g of ferrous carbonate (calculated as $FeCO_3$, the same below), 4.6 g of cobalt sulfate (calculated as $CoSO_4$, the same below) and 4.9 g of vanadium dichloride (calculated as $VCl_2$, the same below) were fully mixed in a mixer for 6 hrs. The mixture was transferred to a reaction kettle, to which, 5 L of deionized water and 1260.6 g of oxalic acid dihydrate (calculated as $C_2H_2O_4 \cdot 2H_2O$, the same below) were added. The reaction kettle was heated to 80° C. and stirred at 600 rpm for 6 hrs until the reaction was terminated (no bubbles were generated), and a suspension of manganese oxalate co-doped with Fe, Co, V, and S was obtained. Then the suspension was filtered, the filter cake was dried at 120° C., and then ground to obtain manganese oxalate dihydrate particles co-doped with Fe, Co and V having a median diameter Dv50 of 100 nm.

Preparation of lithium manganese phosphate co-doped with Fe, Co, V, and S: 1793.4 g of manganese oxalate dihydrate particles obtained in the previous step, 369.0 g of lithium carbonate (calculated as $Li_2CO_3$, the same below), 1.6 g of dilute sulfuric acid having a concentration of 60% (calculated as 60% $H_2SO_4$, the same below) and 1148.9 g of ammonium dihydrogen phosphate (calculated as $NH_4H_2PO_4$, the same below) were added to 20 L of deionized water, and a resulting mixture was stirred for 10 hrs to make it evenly mixed to obtain a slurry. The slurry was transferred to a spray drying device for spray drying and granulation. The drying was performed at a drying temperature of 250° C. for 4 hrs to obtain a powder. In a protective atmosphere of nitrogen (90 vol %)+hydrogen (10 vol %), the above powder was sintered at 700° C. for 4 hrs to obtain 1572.1 g of lithium manganese phosphate co-doped with Fe, Co, V, and S.

(2) Preparation of Lithium Iron Pyrophosphate and Lithium Iron Phosphate

Preparation of lithium iron pyrophosphate powder: 4.77 g of lithium carbonate, 7.47 g of ferrous carbonate, 14.84 g of ammonium dihydrogen phosphate, and 1.3 g of oxalic acid dihydrate were dissolved in 50 mL of deionized water. The pH of the mixture was 5, and the reaction mixture was stirred for 2 hrs to enable the reaction mixture to fully react. Then the reacted solution was heated to 80° C. and kept at such temperature for 4 hrs to obtain a suspension containing $Li_2FeP_2O_7$, which was filtered, washed with deionized water, and dried at 120° C. for 4 hrs to obtain a powder. The powder was sintered at 650° C. under a nitrogen atmosphere for 8 hrs, cooled naturally to room temperature, and then ground to obtain a $Li_2FeP_2O_7$ powder.

Preparation of lithium iron phosphate suspension: 1.1 g of lithium carbonate, 34.8 g of ferrous carbonate, 34.5 g of ammonium dihydrogen phosphate, 1.3 g of oxalic acid dihydrate and 74.6 g of sucrose (calculated as $C_{12}H_{22}O_{11}$, the same below) were dissolved in 150 mL of deionized water, to obtain a mixture, and then stirred for 6 hrs to enable the above mixture to fully react. Then the reacted solution was heated to a temperature of 120° C. and maintained at this temperature for 6 hrs to obtain a suspension containing $LiFePO_4$.

(3) Coating 1572.1 g of the above lithium manganese phosphate co-doped with Fe, Co, V, and S and 15.72 g of the above lithium iron pyrophosphate ($Li_2FeP_2O_7$) powder were added to the lithium iron phosphate ($LiFePO_4$) suspension prepared in the previous step. A resulting mixture were stirred and mixed evenly, then transferred to a vacuum oven to dry at 150° C. for 6 hrs. A resulting product was then dispersed by sand milling. After dispersion, the obtained product was sintered at 700° C. for 6 hrs in a nitrogen atmosphere to obtain a double-layer coated lithium manganese phosphate as a target product.

[Preparation of Cathode Piece]

The double-layer coated lithium manganese phosphate prepared in the above step as a cathode active material, acetylene black as a conductive agent, and polyvinylidene fluoride (PVDF) as a binder were added to N-methylpyrrolidone (NMP) according to a weight ratio of 92:2.5:5.5, a resulting mixture were stirred and mixed evenly to obtain a cathode slurry. Then, the cathode slurry was uniformly coated on an aluminum foil at a ratio of 0.280 g/1540.25 $mm^2$, and the cathode piece was obtained after drying, cold pressing, and slitting.

[Preparation of Anode Piece]

artificial graphite as the anode active material, hard carbon, acetylene black as the conductive agent, styrene-butadiene rubber (SBR) as the binder, thickener carboxymethylcellulose sodium (CMC-Na) were dissolved in deionized water as a solvent according to a weight ratio of 90:5:2:2:1, a resulting mixture were stirred and mixed evenly to prepare an anode slurry. The anode slurry was uniformly coated on a copper foil as an anode current collector at a ratio of 0.117 g/1540.25 $mm^2$, and the anode piece was obtained after drying, cold pressing, and slitting.

[Preparation of Electrolyte]

In an argon atmosphere glove box ($H_2O<0.1$ ppm, $O_2<0.1$ ppm), ethylene carbonate (EC)/ethylmethyl carbonate (EMC) were mixed as an organic solvent according to a volume ratio of 3/7, and $Li(CF_3SO_2)_2N$ (as the first lithium salt, the weight content in the electrolyte was 10%), compound 1 (as the first additive, a weight content in the electrolyte is 1%), $LiBF_4$ (as the second Lithium salt, the weight content in the electrolyte was 1%) was added and stirred evenly to obtain an electrolyte.

[Separator]

A commercially available PP-PE copolymer microporous film having a thickness of 20 m and an average pore size of 80 nm (from Zhuogao Electronic Technology Company, Model 20) was used.

[Preparation of Full Battery]

The above obtained cathode piece, separator, and anode piece were sequentially stacked, so that the separator was arranged in the middle of the cathode and the anode to play the role of isolation, and a bare battery cell was obtained by winding. The bare battery cell was placed in an outer package, to which the above electrolyte was injected and packaged to obtain a full battery (hereinafter also referred to as "full battery").

[Preparation of Button Battery]

The double-layer coated lithium manganese phosphate as the cathode active material, PVDF, and acetylene black were added to NMP at a weight ratio of 90:5:5, and stirred in a drying room to form a slurry. The slurry was coated on an aluminum foil, dried and cold-pressed to form a cathode piece. A coating amount was 0.2 $g/cm^2$, and a compacted density was 2.0 $g/cm^3$.

A lithium sheet as the anode and the above electrolyte together with the cathode piece prepared in the above were used to assemble a button battery (hereinafter also referred to as "button battery") in a button battery cabinet.

Examples 1-2 to 1-6

In the preparation process of the co-doped lithium manganese phosphate core, conditions for preparation of the lithium manganese phosphate core in Examples 1-2 to 1-6 were the same as those in Example 1-1 except that vanadium dichloride and cobalt sulfate were not used, but instead, 463.4 g of ferrous carbonate, 1.6 g of a dilute sulfuric acid having a concentration of 60%, 1148.9 g of ammonium dihydrogen phosphate and 369.0 g of lithium carbonate were used.

In addition, in the preparation process of lithium iron pyrophosphate and lithium iron phosphate and the process of coating the first cladding layer and the second cladding layer, except that the raw materials used were according to the coating amount shown in Table 1 to correspondingly replace the corresponding ratio of the coating amount in Example 1, so that the amount of $Li_2FeP_2O_7/LiFePO_4$ in Examples 1-2 to 1-6 was respectively 12.6 g/37.7 g, 15.7 g/47.1 g, 18.8 g/56.5 g, 22.0 g/66.0 g and 25.1 g/75.4 g, and the amount of sucrose in the Examples 1-2 to 1-6 was 37.3 g, other conditions were identical with Example 1-1.

Examples 1-7 to 1-10

Conditions in Examples 1-7 and 1-10 were the same as those in Example 1-3 except that the amounts of sucrose were 74.6 g, 149.1 g, 186.4 g, and 223.7 g, respectively, so that the corresponding coating amounts of the carbon layer as the second cladding layer were 31.4 g, 62.9 g, 78.6 g, and 94.3 g, respectively.

Examples 1-11 to 1-14

Conditions in Examples 1-11 and 1-14 were the same as those in Example 1-7 except that amounts of respective raw materials in the preparation process of lithium iron pyrophosphate and lithium iron phosphate were adjusted according to the coating amounts shown in Table 1, so that the amounts of $Li_2FeP_2O_7$/$LiFePO_4$ were 23.6 g/39.3 g, 31.4 g/31.4 g, 39.3 g/23.6 g, and 47.2 g/15.7 g, respectively.

Example 1-15

Conditions in Example 1-15 were the same as those in Example 1-14 except that ferrous carbonate in the preparation process of the co-doped lithium manganese phosphate core was substituted by 492.80 g of ZnCO.

Examples 1-16 to 1-18

Conditions in Examples 1-16 to 1-18 were the same as those in Examples 1-7 except that Example 1-16 used 466.4 g of $NiCO_3$, 5.0 g of zinc carbonate, and 7.2 g of titanium sulfate to replace the ferrous carbonate in the preparation process of co-doped lithium manganese phosphate core, Example 1-17 used 455.2 g of ferrous carbonate and 8.5 g of vanadium dichloride in the preparation process of co-doped lithium manganese phosphate core, and Example 1-18 used 455.2 g of ferrous carbonate, 4.9 g of vanadium dichloride, and 2.5 g of magnesium carbonate in the preparation process of co-doped lithium manganese phosphate core.

Examples 1-19 to 1-20

Conditions in Examples 1-19 to 1-20 were the same as those in Examples 1-18 except that Example 1-19 used 369.4 g of lithium carbonate and replaced the dilute sulfuric acid with 1.05 g of a 60% dilute nitric acid in the preparation process of co-doped lithium manganese phosphate core, and Example 1-20 used 369.7 g of lithium carbonate and replaced the dilute sulfuric acid with 0.78 g of silicic acid in the preparation of the co-doped lithium manganese phosphate core.

Examples 1-21 to 1-22

Conditions in Examples 1-21 to 1-22 were the same as those in Examples 1-20 except that Example 1-21 used 632.0 g of manganese carbonate, 463.30 g of ferrous carbonate, 30.5 g of vanadium dichloride, 21.0 g of magnesium carbonate, and 0.78 g of silicate in the preparation process of the co-doped lithium manganese phosphate core, and Example 1-22 used 746.9 g of manganese carbonate, 289.6 g of ferrous carbonate, 60.9 g of vanadium dichloride, 42.1 g of magnesium carbonate, and 0.78 g of silicate in the preparation process of co-doped lithium manganese phosphate core.

Examples 1-23 to 1-24

Conditions in Examples 1-23 to 1-24 were the same as those in Examples 1-22 except that Examples 1-23 used 804.6 g of manganese carbonate, 231.7 g of ferrous carbonate, 1156.2 g of ammonium dihydrogenphosphate, 1.2 g of boric acid (99.5 wt. %) and 370.8 g of boric acid in the preparation process of the co-doped lithium manganese phosphate core, and Example 1-24 used 862.1 g of manganese carbonate, 173.8 g of ferrous carbonate, 1155.1 g of ammonium dihydrogen phosphate, 1.86 g of boric acid (99.5 wt. %), and 371.6 g of lithium carbonate.

Example 1-25

Conditions in Example 1-25 were the same as those in Examples 1-20 except that Example 1-25 used 370.1 g of lithium carbonate, 1.56 g of silicic acid, and 1147.7 g of ammonium dihydrogen phosphate in the preparation process of the co-doped lithium manganese phosphate core.

Example 1-26

Conditions in Example 1-26 were the same as those in Examples 1-20 except that Example 1-26 used 368.3 g of lithium carbonate, 4.9 g of a 60 wt. % dilute sulfuric acid, 919.6 g of manganese carbonate, 224.8 g of ferrous carbonate, 3.7 g of vanadium dichloride, 2.5 g of magnesium carbonate, and 1146.8 g of ammonium dihydrogen phosphate in the preparation process of the co-doped lithium manganese phosphate core.

Examples 1-27

Conditions in Example 1-27 were the same as those in Examples 1-20 except that Example 1-27 used 367.9 g of lithium carbonate, 6.5 g of a dilute sulfuric acid having a concentration of 60%, and 1145.4 g of ammonium dihydrogen phosphate in the preparation process of co-doped lithium manganese phosphate core.

Examples 1-28 to 1-33

Conditions in Examples 1-28 to 1-33 were the same as those in Examples 1-20 except that Example 1-28 to 1-33 used 1034.5 g of manganese carbonate, 108.9 g of ferrous carbonate, 3.7 g of vanadium dichloride, and 2.5 g of magnesium carbonate in the preparation process of co-doped lithium manganese phosphate core, the amounts of lithium carbonate used were 367.6 g, 367.2 g, 366.8 g, 366.4 g, 366.0 g, and 332.4 g, respectively, the amounts of ammonium dihydrogen phosphate used were 1144.5 g, 1143.4 g, 1142.2 g, 1141.1 g, 1139.9 g, and 1138.8 g, respectively, and the amounts of the dilute sulfuric acid having a concentration of 60% used were 8.2 g, 9.8 g, 11.4 g, 13.1 g, 14.7 g of and 16.3 g, respectively.

Examples 2-1 to 2-4

Example 2-1

Conditions of this Example were the same as those in Example 1-1 except that the powder sintering step during the preparation process of lithium iron pyrophosphate ($Li_2FeP_2O_7$) adopted a sintering temperature of 550° C. and a sintering time of 1 hr to control a crystallinity of $Li_2FeP_2O_7$ to 30%, and the coating sintering step during the preparation process of lithium iron phosphate ($LiFePO_4$) adopted a sintering temperature of 650° C. and a sintering time of 2 hrs to control the crystallinity of $LiFePO_4$ to 30%.

Example 2-2

Conditions of this Example were the same as those in Example 1-1 except that the powder sintering step during the preparation process of lithium iron pyrophosphate ($Li_2FeP_2O_7$) adopted a sintering temperature of 550° C. and a sintering time of 2 hrs to control a crystallinity of $Li_2FeP_2O_7$ to 50%, and the coating sintering step during the preparation process of lithium iron phosphate ($LiFePO_4$) adopted a sintering temperature of 650° C. and a sintering time of 3 hrs to control the crystallinity of $LiFePO_4$ to 50%.

Example 2-3

Other conditions of this Example were the same as those in Example 1-1 except that the powder sintering step during the preparation process of lithium iron pyrophosphate ($Li_2FeP_2O_7$) adopted a sintering temperature of 600° C. and a sintering time of 3 hrs to control a crystallinity of $Li_2FeP_2O_7$ to 70%, and the coating sintering step during the preparation process of lithium iron phosphate ($LiFePO_4$) adopted a sintering temperature of 650° C. and a sintering time of 4 hrs to control the crystallinity of $LiFePO_4$ to 70%.

Example 2-4

Conditions of this Example were the same as those in Example 1-1 except that the powder sintering step during the preparation process of lithium iron pyrophosphate ($Li_2FeP_2O_7$) adopted a sintering temperature of 650° C. and a sintering time of 4 hrs to control a crystallinity of $Li_2FeP_2O_7$ to 100%, and the coating sintering step during the preparation process of lithium iron phosphate ($LiFePO_4$) adopted a sintering temperature of 700° C. and a sintering time of 6 hrs to control the crystallinity of $LiFePO_4$ to 100%.

Examples 3-1 to 3-12

Other conditions of Examples 3-1 to 3-12 were the same as those in Example 1-1 except that during the preparation process of manganese oxalate particles co-doped with Fe, Co, and V, the heating temperature/stirring time in the reaction kettle of Example 3-1 was respectively 60° C./120 mins; the heating temperature/stirring time in the reaction kettle of Example 3-2 was respectively 70° C./120 mins; the heating temperature/stirring time in the reaction kettle of Example 3-3 was respectively 80° C./120 mins; the heating temperature/stirring time in the reaction kettle of Example 3-4 was respectively 90° C./120 mins; the heating temperature/stirring time in the reaction kettle of Example 3-5 was respectively 100° C./120 mins; the heating temperature/stirring time in the reaction kettle of Example 3-6 was respectively 110° C./120 mins; the heating temperature/stirring time in the reaction kettle of Example 3-7 was respectively 120° C./120 mins; the heating temperature/stirring time in the reaction kettle of Example 3-8 was respectively 130° C./120 mins; the heating temperature/stirring time in the reaction kettle of Example 3-9 was respectively 100° C./60 mins; the heating temperature/stirring time in the reaction kettle of Example 3-10 was respectively 100° C./90 mins; the heating temperature/stirring time in the reaction kettle of Example 3-11 was respectively 100° C./150 mins; and the heating temperature/stirring time in the reaction kettle of Example 3-12 was respectively 100° C./180 mins.

Examples 4-1 to 4-7

Examples 4-1 to 4-4: conditions of Examples 4-1 to 4-4 were the same as those in Example 1-7 except that the drying temperature/drying time adopted in the drying step during the preparation process of lithium iron pyrophosphate ($Li_2FeP_2O_7$) was 100° C./4 hrs, 150° C./6 hrs, 200° C./6 hrs and 200° C./6 hrs, respectively, and the sintering temperature and sintering time adopted in the sintering step during the preparation of lithium iron pyrophosphate ($Li_2FeP_2O_7$) were 700° C./6 hrs, 700° C./6 hrs, 700° C./6 hrs, and 600° C./6 hrs, respectively.

Examples 4-5 to 4-7: conditions of Examples 4-5 to 4-7 were the same as those in Example 1-12 except that the drying temperature/drying time adopted in the drying step during the coating process was 150° C./6 hrs, 150° C./6 hrs, and 150° C./6 hrs, respectively, and the sintering temperature and sintering time adopted in the sintering step during the coating process were 600° C./4 hrs, 600° C./6 hrs, and 800° C./8 hrs, respectively.

Comparative Example 1

Preparation of manganese oxalate: 1149.3 g of manganese carbonate was added to a reaction kettle, and then 5 L of deionized water and 1260.6 g of oxalic acid dihydrate (calculated as $C_2H_2O_4 \cdot 2H_2O$, the same below) were added. The reaction kettle was heated to 80° C. and stirred at 600 rpm for 6 hrs until the reaction was terminated (no bubbles were generated), so as to obtain a manganese oxalate suspension. After that the suspension was filtered, a resulting filter cake was dried at 120° C., then ground to obtain manganese oxalate dihydrate particles having a median particle diameter Dv50 of 100 nm.

Preparation of carbon-coated lithium manganese phosphate: 1789.6 g of manganese oxalate dihydrate particles obtained from the above, 369.4 g of lithium carbonate (calculated as $Li_2CO_3$, the same below), 1150.1 g of ammonium dihydrogen phosphate (calculated as $NH_4H_2PO_4$, the same below) and 31 g of sucrose (calculated as $C_{12}H_{22}O_{11}$, the same below) were added to 20 L of deionized water, and a resulting mixture was stirred for 10 hrs to make it evenly mixed to obtain a slurry. The slurry was transferred to a spray drying device for spray drying and granulation, during which, a drying temperature was 250° C., and a drying time was 4 hrs, and a powder was obtained. In a protective atmosphere of nitrogen (90 volume %)+hydrogen (10 volume %), the above powder was sintered at 700° C. for 4 hrs to obtain the carbon-coated lithium manganese phosphate.

Comparative Example 2

Conditions of Comparative Example 2 were the same as those in Comparative Example 1 except that 689.5 g of manganese carbonate was used and 463.3 g of ferrous carbonate was additionally added.

Comparative Example 3

Conditions of Comparative Example 2 were the same as those in Comparative Example 1 except that 1148.9 g of ammonium dihydrogen phosphate and 369.0 g of lithium carbonate were used, and 1.6 g of a dilute sulfuric acid having a concentration of 60% was additionally added.

Comparative Example 4

Other conditions of Comparative Example 4 were the same as those in Comparative Example 1 except that 689.5 g of manganese carbonate, 1148.9 g of ammonium dihydrogen phosphate, and 369.0 g of lithium carbonate were used, and 463.3 g of ferrous carbonate and 1.6 g of a dilute sulfuric acid having a concentration of 60% were additionally added.

Comparative Example 5

Conditions of Comparative Example 5 were the same as those of Comparative Example 4 except that the following additional steps were added: preparation of lithium iron pyrophosphate powder: 9.52 g of lithium carbonate, 29.9 g of ferrous carbonate, 29.6 g of ammonium dihydrogen phosphate, and 32.5 g of oxalic acid dihydrate were dissolved in 50 mL of deionized water, a pH value of the mixture was 5, and the reaction mixture was stirred for 2 hrs to fully react. Then a reacted solution was heated to 80° C. and maintained at this temperature for 4 hrs to obtain a suspension containing $Li_2FeP_2O_7$, which was filtered, washed with deionized water, and dried at 120° C. for 4 hrs to obtain a powder. The powder was sintered at 500° C. under a nitrogen atmosphere for 4 hrs, and ground after naturally cooling to room temperature. The crystallinity of $Li_2FeP_2O_7$ was controlled to be 5%, and 62.8 g of $Li_2FeP_2O_7$ was adopted in the preparation of the carbon-coated material.

Comparative Example 6

Conditions of Comparative Example 6 were the same as those of Comparative Example 4 except that the following additional steps were added: preparation of lithium iron pyrophosphate suspension: 14.7 g of lithium carbonate, 46.1 g of ferrous carbonate, 45.8 g of ammonium dihydrogen phosphate, and 50.2 g of oxalic acid dihydrate were dissolved in 500 mL of deionized water, then stirred for 6 hrs to make the mixture fully react. After that a reacted solution was heated to 120° C. and maintained at this temperature for 6 hrs to obtain a suspension containing $LiFePO_4$. The coating sintering step during the preparation process of lithium iron phosphate ($LiFePO_4$) adopted a sintering temperature of 600° C. and a sintering time of 4 hrs to control the crystallinity of $LiFePO_4$ to be 8%; and 62.8 g of $Li_2FeP_2O_7$ was adopted in the preparation of the carbon-coated material.

Comparative Example 7

Preparation of lithium iron pyrophosphate powder: 2.38 g of lithium carbonate, 7.5 g of ferrous carbonate, 7.4 g of ammonium dihydrogen phosphate, and 8.1 g of oxalic acid dihydrate were dissolved in 50 mL of deionized water, a pH value of the mixture was 5, and the reaction mixture was stirred for 2 hrs to fully react. Then a reacted solution was heated to 80° C. and maintained at this temperature for 4 hrs to obtain a suspension containing $Li_2FeP_2O_7$, which was filtered, washed with deionized water, and dried at 120° C. for 4 hrs to obtain a powder. The powder was sintered at 500° C. under a nitrogen atmosphere for 4 hrs, and ground after naturally cooling to room temperature. The crystallinity of $Li_2FeP_2O_7$ was controlled to be 5%, Preparation of lithium iron phosphate suspension: 11.1 g of lithium carbonate, 34.7 g of ferrous carbonate, 34.4 g of ammonium dihydrogen phosphate, 37.7 g of oxalic acid dehydrate, and 37.3 g of sucrose (calculated as $C_{12}H_{22}O_{11}$, the same below) were dissolved in 1500 mL of deionized water, and then stirred for 6 hrs to fully react the mixture. Then a reacted solution was heated to 120° C. and maintained at this temperature for 6 hrs to obtain a suspension containing $Li_2FeP_2O_7$, 15.7 g of the obtained lithium iron phosphate powder was added to the suspension of lithium iron phosphate ($LiFePO_4$) and sucrose. During the preparation process, the coating sintering step adopted a sintering temperature of 600° C. and a sintering time of 4 hrs to control a crystallinity of $LiFePO_4$ to be 8%; other conditions in Comparative Example 7 were the same as those of Comparative Example 4, such that an amorphous lithium iron pyrophosphate, an amorphous lithium iron phosphate, and a carbon-coated cathode active material were obtained.

Comparative Examples 8-11

Conditions of Comparative Examples 8-11 were the same as those in Examples 1-7 except that the drying temperature/drying time adopted in the drying step during the preparation process of lithium iron pyrophosphate ($Li_2FeP_2O_7$) in Comparative Examples 8-10 were 80° C./3 hrs, 80° C./3 hrs, and 80° C./3 hrs, respectively; the sintering temperature and sintering time adopted in the sintering step during the preparation process of lithium iron pyrophosphate ($Li_2FeP_2O_7$) in Comparative Examples 8-10 were 400° C./3 hrs, 400° C./3 hrs, and 350° C./2 hrs, respectively; the drying temperature/drying time in the drying step during the preparation of lithium iron phosphate ($LiFePO_4$) in Example 11 was 80° C./3 hrs; and the amounts of $Li_2FeP_2O_7/LiFePO_4$ in Comparative Examples 8-11 were 47.2 g/15.7 g, 15.7 g/47.2 g, 62.8 g/0 g, and 0 g/62.8 g.

[Preparation of cathode], [preparation of anode], [preparation of electrolyte], [separator], and [preparation of battery] of Examples and Comparative Examples are all the same as those in Example 1-1.

[Related Parameter Tests]

1. Test on Initial Gram Capacity of Button Battery:

At 2.5 to 4.3 V, the button battery fabricated in the above was charged to 4.3 V at a rate of 0.1 C, then charged at a constant voltage of 4.3 V until the current was less than or equal to 0.05 mA, after standing for 5 mins, the button battery was discharged at the rate of 0.1 C to 2.0 V, in such condition, the discharge capacity was the initial gram capacity, denoted as D0.

2. Average Discharge Voltage (V) Test of Button Battery:

The button battery fabricated in the above was stood in a constant temperature environment of 25° C. for 5 mins, then discharged at 0.1 C to 2.5V and stood for 5 minutes, thereafter, charged at 0.1 C to 4.3 V and charged at a constant voltage of 4.3 V until the current was less than or equal to 0.05 mA, followed with standing for 5 mins. After that, the button battery was discharged to 2.5V at 0.1 C. in such condition, the discharge capacity was the initial gram capacity, denoted as D0, the discharge energy was the initial energy, denoted as E0, and the average discharge voltage V was E0/D0.

3. Full Battery 60° C. Flatulence Test:

The full battery fabricated in the above was stored at 100% state of charge (SOC) at 60° C. Before, after, and during the storage, the SOC was monitored by measuring an open circuit voltage (OCV) and an AC internal resistance (IMP) of the battery cell, and a volume of the battery cell was measured. The full battery was taken out after every 48 hrs of storage, and the open circuit voltage (OCV) and internal resistance (IMP) were tested after standing for 1 hr, and the battery cell volume was measured by a drainage method after cooling to room temperature. The drainage method was to first measure the gravity $F_1$ of the battery cell with a balance that automatically performs unit conversion on dial data, and then the battery cell was completely placed in deionized water (the density is known to be 1 g/cm$^3$) to measure the gravity $F_2$ of the battery cell in such condition, a buoyancy F applied to the battery cell was $F_1$-$F_2$, and the battery cell volume V=$(F_1-F_2)/(\rho \times g)$ was calculated based on Archimedes' principle $F_{float}=\rho \times g \times V_{discharge}$.

According to the test results of OCV and IMP, the batteries of all the examples always maintained an SOC of more than 99% during the experiment until the end of storage.

After 30 days of storage, the battery cell volume was measured, and a percentage increase in the battery cell volume after storage relative to the battery cell volume before storage was calculated.

In addition, the residual capacity of the battery cell was measured. At 2.5 to 4.3 V, the full battery was charged to 4.3 V at a rate of 1 C, and then charged at a constant voltage of 4.3 V until the current is less than or equal to 0.05 mA. After standing the battery cell for 5 mins, and the charging capacity in such condition was recorded as the remaining capacity of the battery cell.

4. Test of Cycle Performance of Full Battery at 45° C.:

In a constant temperature environment of 45° C., at 2.5 to 4.3 V, the full battery was charged to 4.3 V at a rate of 0.1 C, then charged at a constant voltage of 4.3 V until the current was less than or equal to 0.05 mA, after standing for 5 mins, the full battery was discharged at the rate of 0.1 C to 2.0 V, in such condition, the discharge capacity was the initial gram capacity, denoted as D0. The above charge and discharge cycle was repeated until the discharge capacity was reduced to 80% of D0. The number of cycles the battery has experienced was recorded in such condition.

5. Lattice Change Rate Test:

In a constant temperature environment of 25° C., a cathode active material sample was placed in XRD (model Bruker D8 Discover), the sample was at tested at 1°/min, and test data were analyzed. Lattice constants a0, b0, c0, and v0 (a0, b0, and c0 represent lengths of the unit cell in all aspects, respectively, and v0 represents the volume of the unit cell, which can be directly obtained from the XRD refinement results) were calculated referring to a standard PDF card.

Using the preparation method for button battery in the above example, the cathode active material sample was prepared as a button battery, and the above button battery was charged at a small rate of 0.05 C until the current was reduced to 0.01 C. Then the cathode piece was taken out of the button battery, and soaked in dimethyl carbonate (DMC) for 8 hrs. After that, the cathode piece was dried, scraped, and particles having a particle size of less than 500 nm were screened. Samples were taken from the particles and the lattice constant v1 was calculated according to the same way as the fresh sample in the above, and (v0−v1)/v0×100% was shown in the table as the lattice change rate (unit cell volume change rate) before and after the complete deintercalation of lithium.

6. Test on Concentration of Li/Mn Antisite Defect:

The XRD results obtained in the "Measurement method of lattice change rate" were compared with the standard crystal PDF (Powder Diffraction File) card, to obtain the concentration of Li/Mn antisite defect. Specifically, the XRD results obtained in the "Measurement method of lattice change rate" were imported into a General Structural Analysis System (GSAS) software, and to automatically obtain the refined results, which include the occupancy of different atoms. By reading the refined result, the concentration of Li/Mn antisite defect was obtained.

7. Transition Metal Dissolution Test:

The full battery was discharged to a cut-off voltage of 2.0 V at a rate of 0.1 C after being cycled at 45° C. until the capacity decayed to 80%. Then the battery was disassembled, and the anode piece was taken out. 30 discs having a unit area (1540.25 mm$^2$) were randomly taken from the anode piece, and the inductively coupled plasma emission spectrum (ICP) was tested with Agilent ICP-OES730. According to the ICP results, an amount of Fe (if the Mn site of the cathode active material is doped with Fe) and Mn was calculated, so as to calculate the dissolution amount of Mn (and Fe doped at the Mn site) after cycling. The test standard was based on EPA-6010D-2014.

8. Surface Oxygen Valence Test:

5 g of a cathode active material sample was taken to prepare a button battery according to the preparation method of button battery as described in the above examples. The button battery was charged with a small rate of 0.05 C until the current decreases to 0.01 C. Then the cathode piece was taken out of the button battery, and soaked in dimethyl carbonate (DMC) for 8 hrs. After that, the cathode piece was dried, scraped, and particles having a particle size of less than 500 nm were screened. The obtained particles were measured by electron energy loss spectroscopy (EELS, instrument model was Talos F200S) to obtain the energy loss near edge structure (ELNES), which reflected the density of states and energy level distribution of elements. According to the density of states and energy level distribution, the number of occupied electrons was calculated by integrating the data of the valence band density of states, so as to calculate the surface oxygen valence after being changed.

9. Measurement of Compaction Density:

5 g of the powder was taken and placed in a special compaction mold (CARVER mold in the United States, model 13 mm), and then the mold was put on the compaction density instrument. A pressure of 3 T was applied, the thickness (thickness after pressure relief, and the area of the container used for the test was 1540.25 mm$^2$) of the powder under such a pressure was read on the equipment, and then the compaction density was calculated by $\rho=m/v$.

10. X-Ray Diffraction Method to Test the Crystallinity of Pyrophosphate and Phosphate 5 g of the cathode active material powder prepared in the above was taken to X-rays was adopted to measure a total scattering intensity, which is the sum of the scattering intensity of the substances in the entire space, and is only related to the intensity of the primary ray, the chemical structure, and the total number of electrons, that is, the weight, participating in the diffraction, but not related to the order state of the sample. Thereafter, the crystalline scattering and the non-crystalline scattering were separated from the diffraction pattern, and the degree of crystallinity was the ratio o he scattering intensity of the crystalline part to the total scattering intensity.

11. Interplanar Spacing and Included Angle 1 g of each cathode active material powder prepared in the above was placed in a 50 mL test tube, to which, 10 mL of alcohol having a weight percent of 75% was added; then a resulting mixture was fully stirred and dispersed for 30 mins, and then an appropriate amount of the above solution was sucked by using a clean disposable plastic straw and dripped on a 300-mesh copper grid. In such condition, part of the powder remained on the copper grid. The copper grid together with the sample was transferred to a sample chamber of a TEM (Talos F200s G2) for testing, and original pictures of the TEM test were obtained and saved in an original picture format (xx.dm3).

The original pictures obtained from the above TEM test was opened in DigitalMicrograph software, and performed with Fourier transform (automatically completed by the software after clicking the operation) to obtain a diffraction pattern, and a distance from the diffraction spot to the center position in the diffraction pattern was measured to obtain the interplanar spacing, and the included angle was calculated according to the Bragg equation.

TABLE 1

Performance test results of Examples 1-1 to 1-33 and Comparative Example 1-7

| Example number | Core | First cladding layer | Second cladding layer | Lattice change rate (%) | Concentration of Li/Mn antisite defect/% | Surface oxygen valence state |
|---|---|---|---|---|---|---|
| Example 1-1 | $Li_{0.999}Mn_{0.60}Fe_{0.393}V_{0.004}Co_{0.003}P_{0.999}S_{0.001}O_4$ | 1% $Li_2FeP_2O_7$/3% $LiFePO_4$ | 2% carbon | 2.4 | 0.4 | −1.98 |
| Example 1-2 | $Li_{0.999}Mn_{0.60}Fe_{0.40}P_{0.999}S_{0.001}O_4$ | 0.8% $Li_2FeP_2O_7$/2.4% $LiFePO_4$ | 1% carbon | 6.6 | 1.2 | −1.97 |
| Example 1-3 | $Li_{0.999}Mn_{0.60}Fe_{0.40}P_{0.999}S_{0.001}O_4$ | 1% $Li_2FeP_2O_7$/3% $LiFePO_4$ | 1% carbon | 6.5 | 1.1 | −1.97 |
| Example 1-4 | $Li_{0.999}Mn_{0.60}Fe_{0.40}P_{0.999}S_{0.001}O_4$ | 1.2% $Li_2FeP_2O_7$/3.6% $LiFePO_4$ | 1% carbon | 6.5 | 0.8 | −1.97 |
| Example 1-5 | $Li_{0.999}Mn_{0.60}Fe_{0.40}P_{0.999}S_{0.001}O_4$ | 1.4% $Li_2FeP_2O_7$/4.2% $LiFePO_4$ | 1% carbon | 6.5 | 0.7 | −1.98 |
| Example 1-6 | $Li_{0.999}Mn_{0.60}Fe_{0.40}P_{0.999}S_{0.001}O_4$ | 1.6% $Li_2FeP_2O_7$/4.8% $LiFePO_4$ | 1% carbon | 6.6 | 0.6 | −1.98 |
| Example 1-7 | $Li_{0.999}Mn_{0.60}Fe_{0.40}P_{0.999}S_{0.001}O_4$ | 1% $Li_2FeP_2O_7$/3% $LiFePO_4$ | 2% carbon | 6.5 | 1.0 | −1.97 |
| Example 1-8 | $Li_{0.999}Mn_{0.60}Fe_{0.40}P_{0.999}S_{0.001}O_4$ | 1% $Li_2FeP_2O_7$/3% $LiFePO_4$ | 4% carbon | 6.5 | 1.0 | −1.97 |
| Example 1-9 | $Li_{0.999}Mn_{0.60}Fe_{0.40}P_{0.999}S_{0.001}O_4$ | 1% $Li_2FeP_2O_7$/3% $LiFePO_4$ | 5% carbon | 6.4 | 1.1 | −1.98 |
| Example 1-10 | $Li_{0.999}Mn_{0.60}Fe_{0.40}P_{0.999}S_{0.001}O_4$ | 1% $Li_2FeP_2O_7$/3% $LiFePO_4$ | 6% carbon | 6.4 | 1.1 | −1.98 |
| Example 1-11 | $Li_{0.999}Mn_{0.60}Fe_{0.40}P_{0.999}S_{0.001}O_4$ | 1.5% $Li_2FeP_2O_7$/2.5% $LiFePO_4$ | 2% carbon | 6.5 | 1.1 | −1.97 |
| Example 1-12 | $Li_{0.999}Mn_{0.60}Fe_{0.40}P_{0.999}S_{0.001}O_4$ | 2% $Li_2FeP_2O_7$/2% $LiFePO_4$ | 2% carbon | 6.6 | 1.0 | −1.96 |
| Example 1-13 | $Li_{0.999}Mn_{0.60}Fe_{0.40}P_{0.999}S_{0.001}O_4$ | 2.5% $Li_2FeP_2O_7$/1.5% $LiFePO_4$ | 2% carbon | 6.7 | 1.2 | −1.96 |
| Example 1-14 | $Li_{0.999}Mn_{0.60}Fe_{0.40}P_{0.999}S_{0.001}O_4$ | 3% $Li_2FeP_2O_7$/1% $LiFePO_4$ | 2% carbon | 6.7 | 1.1 | −1.97 |
| Example 1-15 | $Li_{0.999}Mn_{0.60}Zn_{0.40}P_{0.999}S_{0.001}O_4$ | 3% $Li_2FeP_2O_7$/1% $LiFePO_4$ | 2% carbon | 7.5 | 2.5 | −1.97 |
| Example 1-16 | $Li_{0.993}Mn_{0.6}Ni_{0.393}Zn_{0.004}Ti_{0.003}P_{0.999}S_{0.001}O_4$ | 1% $Li_2FeP_2O_7$/3% $LiFePO_4$ | 2% carbon | 5.4 | 0.8 | −1.97 |
| Example 1-17 | $Li_{0.999}Mn_{0.60}Fe_{0.393}V_{0.007}P_{0.999}S_{0.001}O_4$ | 1% $Li_2FeP_2O_7$/3% $LiFePO_4$ | 2% carbon | 4.2 | 0.6 | −1.97 |
| Example 1-18 | $Li_{0.999}Mn_{0.60}Fe_{0.393}V_{0.004}Mg_{0.003}P_{0.999}S_{0.001}O_4$ | 1% $Li_2FeP_2O_7$/3% $LiFePO_4$ | 2% carbon | 2.6 | 0.5 | −1.97 |
| Example 1-19 | $LiMn_{0.60}Fe_{0.393}V_{0.004}Mg_{0.003}P_{0.999}N_{0.001}O_4$ | 1% $Li_2FeP_2O_7$/3% $LiFePO_4$ | 2% carbon | 2.3 | 0.5 | −1.98 |
| Example 1-20 | $Li_{1.001}Mn_{0.60}Fe_{0.393}V_{0.004}Mg_{0.003}P_{0.999}Si_{0.001}O_4$ | 1% $Li_2FeP_2O_7$/3% $LiFePO_4$ | 2% carbon | 2.4 | 0.7 | −1.98 |

TABLE 1-continued

Performance test results of Examples 1-1 to 1-33 and Comparative Example 1-7

| | | | | | | |
|---|---|---|---|---|---|---|
| Example 1-21 | $Li_{1.001}Mn_{0.55}Fe_{0.40}V_{0.025}Mg_{0.025}P_{0.999}Si_{0.001}O_4$ | 1% $Li_2FeP_2O_7$/3% $LiFePO_4$ | 2% carbon | 2.2 | 0.5 | −1.98 |
| Example 1-22 | $Li_{1.001}Mn_{0.65}Fe_{0.25}V_{0.05}Mg_{0.05}P_{0.999}Si_{0.001}O_4$ | 1% $Li_2FeP_2O_7$/3% $LiFePO_4$ | 2% carbon | 2.5 | 0.8 | −1.98 |
| Example 1-23 | $Li_{1.004}Mn_{0.7}Fe_{0.2}V_{0.05}Mg_{0.05}P_{0.998}B_{0.002}O_4$ | 1% $Li_2FeP_2O_7$/3% $LiFePO_4$ | 2% carbon | 2.6 | 0.8 | −1.98 |
| Example 1-24 | $Li_{1.006}Mn_{0.75}Fe_{0.15}V_{0.05}Mg_{0.05}P_{0.997}B_{0.003}O_4$ | 1% $Li_2FeP_2O_7$/3% $LiFePO_4$ | 2% carbon | 2.6 | 0.8 | −1.98 |
| Example 1-25 | $Li_{1.002}Mn_{0.60}Fe_{0.393}V_{0.004}Mg_{0.003}P_{0.998}Si_{0.002}O_4$ | 1% $Li_2FeP_2O_7$/3% $LiFePO_4$ | 2% carbon | 2.3 | 0.7 | −1.98 |
| Example 1-26 | $Li_{0.997}Mn_{0.80}Fe_{0.194}V_{0.003}Mg_{0.003}P_{0.997}S_{0.003}O_4$ | 1% $Li_2FeP_2O_7$/3% $LiFePO_4$ | 2% carbon | 2.8 | 0.9 | −1.98 |
| Example 1-27 | $Li_{0.996}Mn_{0.60}Fe_{0.393}V_{0.004}Mg_{0.003}P_{0.996}S_{0.004}O_4$ | 1% $Li_2FeP_2O_7$/3% $LiFePO_4$ | 2% carbon | 2.2 | 0.6 | −1.98 |
| Example 1-28 | $Li_{0.995}Mn_{0.9}Fe_{0.094}V_{0.003}Mg_{0.003}P_{0.995}S_{0.005}O_4$ | 1% $Li_2FeP_2O_7$/3% $LiFePO_4$ | 2% carbon | 3.2 | 1.1 | −1.96 |
| Example 1-29 | $Li_{0.994}Mn_{0.90}Fe_{0.094}V_{0.003}Mg_{0.003}P_{0.994}S_{0.006}O_4$ | 1% $Li_2FeP_2O_7$/3% $LiFePO_4$ | 2% carbon | 3.0 | 1.2 | −1.95 |
| Example 1-30 | $Li_{0.993}Mn_{0.90}Fe_{0.094}V_{0.003}Mg_{0.003}P_{0.993}S_{0.007}O_4$ | 1% $Li_2FeP_2O_7$/3% $LiFePO_4$ | 2% carbon | 2.8 | 1.4 | −1.95 |
| Example 1-31 | $Li_{0.992}Mn_{0.90}Fe_{0.094}V_{0.003}Mg_{0.003}P_{0.992}S_{0.008}O_4$ | 1% $Li_2FeP_2O_7$/3% $LiFePO_4$ | 2% carbon | 2.6 | 1.4 | −1.94 |
| Example 1-32 | $Li_{0.991}Mn_{0.90}Fe_{0.094}V_{0.003}Mg_{0.003}P_{0.991}S_{0.009}O_4$ | 1% $Li_2FeP_2O_7$/3% $LiFePO_4$ | 2% carbon | 2.4 | 1.2 | −1.94 |
| Example 1-33 | $Li_{0.9}Mn_{0.90}Fe_{0.094}V_{0.003}Mg_{0.003}P_{0.9}S_{0.1}O_4$ | 1% $Li_2FeP_2O_7$/3% $LiFePO_4$ | 2% carbon | 2.1 | 0.9 | −1.94 |
| Comparative Example 1 | $LiMnPO_4$ | — | 1% carbon | 11.4 | 3.2 | −1.55 |
| Comparative Example 2 | $LiMn_{0.60}Fe_{0.40}PO_4$ | — | 1% carbon | 8.7 | 2.8 | −1.76 |
| Comparative Example 3 | $Li_{0.999}MnP_{0.999}S_{0.001}O_4$ | — | 1% carbon | 9.8 | 2.5 | −1.66 |
| Comparative Example 4 | $Li_{0.999}Mn_{0.60}Fe_{0.40}P_{0.999}S_{0.001}O_4$ | — | 1% carbon | 6.7 | 1.8 | −1.83 |
| Comparative Example 5 | $Li_{0.999}Mn_{0.60}Fe_{0.40}P_{0.999}S_{0.001}O_4$ | 4% amorphous $Li_2FeP_2O_7$ | 1% carbon | 6.5 | 1.8 | −1.90 |
| Comparative Example 6 | $Li_{0.999}Mn_{0.60}Fe_{0.40}P_{0.999}S_{0.001}O_4$ | 4% amorphous $Li_2FeP_2O_7$ | 1% carbon | 6.6 | 1.8 | −1.91 |
| Comparative Example 7 | $Li_{0.999}Mn_{0.60}Fe_{0.40}P_{0.999}S_{0.001}O_4$ | 4% amorphous $Li_2FeP_2O_7$ + 3% amorphous $LiFePO_4$ | 1% carbon | 6.6 | 1.8 | −1.90 |

| Example number | Dissolution of Fe and manganese ions after cycling (ppm) | Gram capacity (mAh/g) of button battery at 0.1 C | Average discharge voltage (V) of button battery | Cell expansion (%) after storage at 60° C. for 30 days | Cycles number corresponding to 80% capacity retention at 45° C. |
|---|---|---|---|---|---|
| Example 1-1 | 7 | 159.4 | 3.81 | 1.8 | 1461 |
| Example 1-2 | 54 | 152.4 | 3.8 | 6.0 | 884 |
| Example 1-3 | 41 | 151.9 | 3.77 | 5.0 | 1010 |
| Example 1-4 | 27 | 150.0 | 3.77 | 4.5 | 1065 |

TABLE 1-continued

Performance test results of Examples 1-1 to 1-33 and Comparative Example 1-7

| | | | | | |
|---|---|---|---|---|---|
| Example 1-5 | 17 | 150.4 | 3.78 | 3.4 | 1170 |
| Example 1-6 | 13 | 148.8 | 3.76 | 2.6 | 1308 |
| Example 1-7 | 36 | 150.8 | 3.79 | 4.5 | 1065 |
| Example 1-8 | 32 | 149.6 | 3.80 | 4.0 | 1113 |
| Example 1-9 | 25 | 146.3 | 3.78 | 3.5 | 1219 |
| Example 1-10 | 15 | 145.3 | 3.77 | 2.6 | 1341 |
| Example 1-11 | 29 | 151.9 | 3.79 | 4.9 | 1020 |
| Example 1-12 | 19 | 151.5 | 3.78 | 5.7 | 987 |
| Example 1-13 | 15 | 151.0 | 3.77 | 6.5 | 898 |
| Example 1-14 | 8 | 151.4 | 3.8 | 7.1 | 840 |
| Example 1-15 | 15 | 142.4 | 3.91 | 7.9 | 943 |
| Example 1-16 | 12 | 142.2 | 3.90 | 4.2 | 1071 |
| Example 1-17 | 11 | 154.4 | 3.83 | 3.0 | 1365 |
| Example 1-18 | 9 | 156.8 | 3.84 | 2.5 | 1370 |
| Example 1-19 | 8 | 158.9 | 3.85 | 2.0 | 1484 |
| Example 1-20 | 9 | 158.4 | 3.85 | 2.3 | 1505 |
| Example 1-21 | 7 | 159.1 | 3.76 | 1.9 | 1605 |
| Example 1-22 | 10 | 158.1 | 3.87 | 2.6 | 1411 |
| Example 1-23 | 9 | 158.2 | 3.88 | 2.4 | 1395 |
| Example 1-24 | 9 | 158.7 | 3.87 | 2.4 | 1462 |
| Example 1-25 | 9 | 158.4 | 3.83 | 2.3 | 1506 |
| Example 1-26 | 10 | 156.8 | 3.88 | 2.7 | 1241 |
| Example 1-27 | 9 | 158.6 | 3.83 | 2.3 | 1533 |
| Example 1-28 | 11 | 158.0 | 3.92 | 3.0 | 1198 |
| Example 1-29 | 12 | 157.2 | 3.91 | 3.0 | 1142 |
| Example 1-30 | 14 | 156.8 | 3.94 | 2.9 | 1043 |
| Example 1-31 | 14 | 156.6 | 3.93 | 2.8 | 1009 |
| Example 1-32 | 15 | 156.1 | 3.92 | 2.6 | 987 |
| Example 1-33 | 17 | 155.7 | 3.94 | 2.5 | 967 |
| Comparative Example 1 | 1344 | 129.2 | 4.07 | 45.7 | 204 |
| Comparative Example 2 | 1009 | 138.1 | 3.83 | 40.0 | 394 |
| Comparative Example 3 | 1225 | 132.4 | 4.1 | 42.8 | 294 |
| Comparative Example 4 | 780 | 144.3 | 3.81 | 36.2 | 459 |
| Comparative Example 5 | 129 | 143.1 | 3.77 | 11.8 | 571 |
| Comparative Example 6 | 208 | 143.5 | 3.77 | 10.8 | 581 |
| Comparative Example 7 | 104 | 143.4 | 3.8 | 8.1 | 750 |

Remarks:
1) The crystallinity of $Li_2FeP_2O_7$ and $LiFePO_4$ in Examples 1-1 to 1-33 is 100%;
2) In Comparative Example 5-7, the crystallinity of $Li_2FeP_2O_7$ is 5%, and the crystallinity of $LiFePO_4$ is 8%.

Based on Examples 1-1 to 1-33 and Comparative Example 1-4, it can be seen that the existence of the first cladding layer is beneficial to reduce the concentration of Li/Mn antisite defect in the obtained material and the dissolution of Fe and manganese ions after cycling, improve the gram capacity of the button batter, and improve the safety performance and cycle performance of the battery. When the Mn site and the phosphorus site are respectively doped with other elements, the lattice change rate, the concentration of anti-site defect and the dissolution of Fe and manganese ions can be significantly reduced, the gram capacity of the battery can be increased, and the safety performance and cycle performance of the battery can be improved.

Combining Examples 1-1 to 1-6, it can be seen that as the amount of the first cladding layer increases from 3.2% to 6.4%, the concentration of Li/Mn antisite defect in the obtained material gradually decreases, and the dissolution of Fe and manganese ions after cycling gradually decreases, the safety performance and the cycle performance at 45° C. of the corresponding battery are also improved, but the gram capacity of the button battery decreases slightly. Optionally, when the total amount of the first cladding layer is 4-5.6 wt. %, the overall performance of the corresponding battery is the best.

Combining Examples 1-3 and Examples 1-7 to 1-10, it can be seen that as the amount of the second cladding layer increases from 1% to 6%, the concentration of Li/Mn antisite defect of the obtained material gradually decreases, and the dissolution of Fe and manganese ions after cycling gradually decreases, the safety performance and the cycle performance at 45° C. of the corresponding battery are also improved, but the gram capacity of the button battery decreases slightly. Optionally, when the total amount of the second cladding layer is 3-5 wt. %, the overall performance of the corresponding battery is the best.

Based on Examples 1-11 to 1-15 and Comparative Examples 5-6, it can be seen that when both $Li_2FeP_2O_7$ and $LiFePO_4$ exist in the first cladding layer, especially when a weight ratio of $Li_2FeP_2O_7$ to $LiFePO_4$ is between 1:3 and 3:1, and especially between 1:3 and 1:1, the improvement of battery performance is more obvious.

TABLE 2

Performance test results of Examples 2-1 to 2-4

| Example number | First cladding layer | Crystallinity of pyrophosphate and phosphate[1] | Lattice change rate (%) | Concentration of Li/Mn antisite defect/% | Surface oxygen valence state | Dissolution of Fe and manganese ions after cycling (ppm) | Gram capacity (mAh/g) of button battery at 0.1 C | Average discharge voltage (V) of button battery | Cell expansion (%) after storage at 60° C. for 30 days | Cycles number corresponding to 80% capacity retention at 45° C. |
|---|---|---|---|---|---|---|---|---|---|---|
| Example 2-1 | 1% $Li_2FeP_2O_7$/3% $LiFePO_4$ | 30% | 6.3 | 1.9 | −1.88 | 122 | 149.1 | 3.75 | 5.3 | 768 |
| Example 2-2 | 1% $Li_2FeP_2O_7$/3% $LiFePO_4$ | 50% | 4.7 | 1.2 | −1.89 | 82 | 153.0 | 3.81 | 4.4 | 956 |
| Example 2-3 | 1% $Li_2FeP_2O_7$/3% $LiFePO_4$ | 70% | 3.5 | 0.8 | −1.91 | 27 | 154.5 | 3.81 | 3.6 | 1130 |
| Example 2-4 | 1% $Li_2FeP_2O_7$/3% $LiFePO_4$ | 100% | 2.4 | 0.4 | −1.98 | 8 | 158.6 | 3.82 | 1.8 | 1461 |

[1]referring to that the crystallinity of pyrophosphate and phosphate is 30%, 50%, 70%, 100%, respectively.

It can be seen from Table 2 that as the crystallinity of pyrophosphate and phosphate in the first cladding layer gradually increases, the lattice change rate, the concentration of Li/Mn antisite defect, and the dissolution of Fe and manganese ions in the corresponding material gradually decrease, the capacity of the button battery gradually increases, and the safety performance and cycle performance are also gradually improved.

TABLE 3

Performance test results of Examples 3-1 to 3-12

| Example number | Temperature in reaction kettle/° C. | Stirring time/mins | Lattice change rate (%) | Concentration of Li/Mn antisite defect/% | Surface oxygen valence state | Dissolution of Fe and manganese ions after cycling (ppm) | Gram capacity (mAh/g) of button battery at 0.1 C | Average discharge voltage (V) of button battery | Cell expansion (%) after storage at 60° C. for 30 days | Cycles number corresponding to 80% capacity retention at 45° C. |
|---|---|---|---|---|---|---|---|---|---|---|
| Example 3-1 | 60 | 120 | 5.6 | 2.4 | −1.98 | 46 | 155.9 | 3.69 | 5.4 | 1157 |
| Example 3-2 | 70 | 120 | 4.8 | 1.9 | −1.98 | 34 | 156.2 | 3.71 | 4.4 | 1263 |

TABLE 3-continued

Performance test results of Examples 3-1 to 3-12

| Example number | Temperature in reaction kettle/°C. | Stirring time/mins | Lattice change rate (%) | Concentration of Li/Mn antisite defect/% | Surface oxygen valence state | Dissolution of Fe and manganese ions after cycling (ppm) | Gram capacity (mAh/g) of button battery at 0.1 C | Average discharge voltage (V) of button battery | Cell expansion (%) after storage at 60° C. for 30 days | Cycles number corresponding to 80% capacity retention at 45° C. |
|---|---|---|---|---|---|---|---|---|---|---|
| Example 3-3 | 80 | 120 | 3.7 | 1.3 | −1.98 | 25 | 156.7 | 3.74 | 3.5 | 1339 |
| Example 3-4 | 90 | 120 | 2.9 | 1.1 | −1.98 | 14 | 158.5 | 3.77 | 2.8 | 1370 |
| Example 3-5 | 100 | 120 | 2.5 | 0.5 | −1.98 | 6 | 158.9 | 3.8 | 2.2 | 1393 |
| Example 3-6 | 110 | 120 | 2.8 | 1.2 | −1.98 | 14 | 157.1 | 3.75 | 3.4 | 1320 |
| Example 3-7 | 120 | 120 | 3.7 | 2.1 | −1.98 | 32 | 155.5 | 3.71 | 4.4 | 1238 |
| Example 3-8 | 130 | 120 | 4.5 | 3.4 | −1.98 | 43 | 154.2 | 3.66 | 5.8 | 1035 |
| Example 3-9 | 100 | 60 | 4.9 | 3.1 | −1.98 | 35 | 155.9 | 3.78 | 4.5 | 1072 |
| Example 3-10 | 100 | 90 | 4.1 | 2.5 | −1.98 | 24 | 156.7 | 3.79 | 4.0 | 1152 |
| Example 3-11 | 100 | 150 | 3.5 | 1.1 | −1.98 | 12 | 158.3 | 3.81 | 2.8 | 1243 |
| Example 3-12 | 100 | 180 | 2.5 | 0.5 | −1.98 | 8 | 158.6 | 3.81 | 2.2 | 1362 |

Remark

The temperature in the reaction kettle and the stirring time are parameters during the preparation of A-doped manganese oxalate (that is, step (2)). Doping element and doping amount is $Li_{0.999}Mn_{0.60}Fe_{0.393}V_{0.004}Co_{0.003}P_{0.999}S_{0.001}O_4$.

It can be seen from Table 3 that by adjusting the reaction temperature and reaction time in the reaction kettle during the preparation of manganese oxalate particles, various properties of the cathode material described in the present application can be further improved. For example, when the reaction temperature gradually increases from 60° C. to 130° C., the lattice change rate and concentration of Li/Mn antisite defect firstly decrease and then increase, and the corresponding metal dissolution after cycling and safety performance also showed similar trends, while the capacity of the button battery and the cycle performance firstly increase and then decrease along with the increase of temperature. Similar trends are also shown in cases where the reaction temperature is controlled unchanged and the reaction time is adjusted.

TABLE 4

Performance test results of Examples 4-1 to 4-7 and Comparative Examples 8-11

| Example number | $Li_2FeP_2O_7:LiFePO_4$ (weight ratio) | Drying temperature (° C.) | Drying time (h) | Sintering temperature (° C.) | Sintering time (h) | Interplanar space (nm) of pyrophosphate in the first cladding layer | Included angle (°) of pyrophosphate in the first cladding layer | Interplanar space (nm) of phosphate in the first cladding layer |
|---|---|---|---|---|---|---|---|---|
| Example 4-1 | 1:3 | 100 | 4 | 700 | 6 | 0.303 | 29.496 | 0.348 |
| Example 4-2 | 1:3 | 150 | 6 | 700 | 6 | 0.303 | 29.496 | 0.348 |
| Example 4-3 | 1:3 | 200 | 6 | 700 | 6 | 0.303 | 29.496 | 0.348 |
| Example 4-4 | 1:3 | 200 | 6 | 600 | 6 | 0.303 | 29.496 | 0.348 |
| Example 4-5 | 1:1 | 150 | 6 | 600 | 4 | 0.303 | 29.496 | 0.348 |
| Example 4-6 | 1:1 | 150 | 6 | 600 | 6 | 0.303 | 29.496 | 0.348 |
| Example 4-7 | 1:1 | 150 | 6 | 800 | 8 | 0.303 | 29.496 | 0.348 |
| Comparative Example 8 | 1:3 | 80 | 3 | 400 | 3 | — | — | — |
| Comparative Example 9 | 1:1 | 80 | 3 | 400 | 3 | — | — | — |

TABLE 4-continued

Performance test results of Examples 4-1 to 4-7 and Comparative Examples 8-11

| | | | | | | | | |
|---|---|---|---|---|---|---|---|---|
| Comparative Example 10 | Only $Li_2FeP_2O_7$ | 80 | 3 | 350 | 2 | — | — | — |
| Comparative Example 11 | Only $LiFePO_4$ | 80 | 3 | — | — | — | — | — |

| Example number | Included angle (°) of phosphate in the first cladding layer | Lattice change rate (%) | Concentration of Li/Mn antisite defect/% | Surface oxygen valence state | Dissolution of Fe and manganese ions after cycling (ppm) | Gram capacity (mAh/g) of button battery at 0.1 C | Average discharge voltage (V) of button battery | Cell expansion (%) after storage at 60° C. for 30 days | Cycle number corresponding to 80% capacity retention at 45° C. |
|---|---|---|---|---|---|---|---|---|---|
| Example 4-1 | 25.562 | 2.9 | 0.6 | −1.97 | 37 | 155.9 | 3.73 | 3.2 | 1242 |
| Example 4-2 | 25.562 | 2.6 | 0.6 | −1.98 | 37 | 158.8 | 3.8 | 2.2 | 1414 |
| Example 4-3 | 25.562 | 2.7 | 0.6 | −1.98 | 39 | 157.1 | 3.75 | 2.9 | 1341 |
| Example 4-4 | 25.562 | 2.9 | 1.1 | −1.95 | 37 | 154.5 | 3.71 | 3.7 | 1033 |
| Example 4-5 | 25.562 | 2.8 | 1.2 | −1.94 | 20 | 155.9 | 3.73 | 3.3 | 940 |
| Example 4-6 | 25.562 | 2.6 | 0.8 | −1.95 | 19 | 156.4 | 3.74 | 2.9 | 1011 |
| Example 4-7 | 25.562 | 2.5 | 0.4 | −1.97 | 19 | 157.8 | 3.76 | 2.5 | 1095 |
| Comparative Example 8 | — | 3.9 | 1.8 | −1.91 | 74 | 142.0 | 3.13 | 9.1 | 799 |
| Comparative Example 9 | — | 3.6 | 1.6 | −1.93 | 63 | 141.8 | 3.17 | 6.4 | 705 |
| Comparative Example 10 | — | 3.7 | 1.7 | −1.86 | 58 | 140.3 | 3.14 | 10.8 | 417 |
| Comparative Example 11 | — | 3.4 | 1.4 | −1.93 | 81 | 142.6 | 3.16 | 4.4 | 554 |

It can be seen from Table 4 that when preparing lithium iron pyrophosphate by using the method of the present application, the performance of the obtained material can be improved by adjusting the drying temperature/time and sintering temperature/time during the preparation process, thereby improving the battery performance. It can be seen from Comparative Examples 8-11 that when the drying temperature in the preparation process of lithium iron pyrophosphate is lower than 100° C. or the temperature in the sintering step is lower than 400° C., the $Li_2FeP_2O_7$ desired to be prepared by the present application will not be obtained, thus the material properties and performance of batteries comprising the resulting materials cannot be improved.

Example 5-40

The cathode active material, the button battery, and the full battery in this Example were fabricated in the same manner as in Examples 1-18, but the composition of the electrolyte was changed, as shown in Table 5 below.

In addition, the performance data of the button batter or full-battery of Example 5-40 were measured according to the above performance test methods, as shown in Table 6.

TABLE 5

Compositions of Electrolytes

| Example number | First lithium salt | Content W1 (%) | First additive | Content W2 (%) | M, defined as W2/W1 | Second lithium salt | Content W3 (%) | (W2 + W3)/W1 | Q, defined as (W1 + W2)/(C1 + C2) |
|---|---|---|---|---|---|---|---|---|---|
| 5 | The same as in Example 1-18 | 5 | The same as in Example 1-18 | | 0.20 | The same as in Example 1-18 | | 0.24 | 1.50 |
| 6 | | 20 | | | 0.05 | | | 0.06 | 5.25 |
| 7 | | 18 | | | 0.06 | | | 0.07 | 4.75 |
| 8 | | 36 | | | 0.03 | | | 0.03 | 9.25 |
| 9 | | 0.1 | | | 10.00 | | | 12.00 | 0.28 |
| 10 | | 48 | | | 0.02 | | | 0.03 | 12.25 |
| 11 | | 0.05 | | | 20.00 | | | 24.00 | 0.26 |
| 12 | | 50 | | | 0.02 | | | 0.02 | 12.75 |
| 13 | The same as in Example | | 0.3 | 0.03 | | The same as in Example 1-18 | 0.05 | 2.58 |
| 14 | | | 5 | 0.5 | | | 0.52 | 3.75 |
| 15 | | | 1.5 | 0.1 | | | 0.12 | 2.75 |

TABLE 5-continued

Compositions of Electrolytes

| Example number | First lithium salt | Content W1 (%) | First additive | Content W2 (%) | M, defined as W2/W1 | Second lithium salt | Content W3 (%) | (W2 + W3)/W1 | Q, defined as (W1 + W2)/(C1 + C2) |
|---|---|---|---|---|---|---|---|---|---|
| 16 | 1-18 | | | 3 | 0.3 | | | 0.32 | 3.25 |
| 17 | | | | 0.01 | 0.001 | | | 0.02 | 2.50 |
| 18 | | | | 20 | 2 | | | 2.02 | 7.50 |
| 19 | | | The same as in | | | | 0.3 | 0.13 | 1.83 |
| 20 | | | Example 1-18 | | | | 5 | 0.60 | 1.83 |
| 21 | | | | | | | 1.5 | 0.20 | 1.83 |
| 22 | | | | | | | 8 | 0.90 | 1.83 |
| 23 | | | | | | | 0.01 | 0.10 | 1.83 |
| 24 | | | | | | | 20 | 2.10 | 1.83 |
| 25 | The same | 20 | The same | 0.02 | 0.001 | The same | 1 | 0.051 | 5.01 |
| 26 | as in | 0.3 | as in | 0.9 | 3 | as in | 1 | 6.33 | 0.30 |
| 27 | Example | 20 | Example | 0.1 | 0.005 | Example | 0.1 | 0.01 | 5.03 |
| 28 | 1-18 | 0.5 | 1-18 | 0.5 | 1 | 1-18 | 0.5 | 2 | 0.25 |
| 29 | | 2.46 | | 0.5 | 0.2 | | 1 | 4.27 | 0.74 |
| 30 | | 45.1 | | 14 | 0.31 | | 1 | 0.33 | 14.78 |
| 31 | | 0.3 | | 0.1 | 0.33 | | 1 | 3.67 | 0.10 |
| 32 | | 30 | | 10 | 0.33 | | 1 | 0.37 | 10.00 |
| 33 | LiN(CF3SO2)(FSO2) | | | | The same as in Example 1-18 | | | | |
| 34 | LiN(CF3CF2CF2CF2SO2)(FSO2) | | | | | | | | |
| 35 | The same as in | | Compound 2 | | The same as in Example 1-18 | | | | |
| 36 | Example 1-18 | | Compound 3 | | | | | | |
| 37 | | | Compound 4 | | | | | | |
| 38 | | | Compound 5 | | | | | | |
| 39 | | | The same as in Example 1-18 | | | Lithium difluorooxalate borate | | The same in Example 1-18 | |
| 40 | | | | | | Lithium difluorodioxalate phosphate | | | |

TABLE 6

Performance data of button batteries or full batteries of Examples 5-40 according to the above performance test methods

| Example number | Dissolution of Fe and manganese ions after cycling (ppm) | Gram capacity (mAh/g) of button battery at 0.1 C | Average discharge voltage (V) of button battery | Expansion rate (%) of battery cell stored at 60° C. for 30 d | Cycle number corresponding to 80% capacity retention at 45° C. |
|---|---|---|---|---|---|
| Example 5 | 35 | 154.7 | 3.82 | 3.4 | 1100 |
| Example 6 | 8 | 157.6 | 3.86 | 2.4 | 1380 |
| Example 7 | 9 | 156.9 | 3.87 | 2.3 | 1376 |
| Example 8 | 7 | 155.1 | 3.84 | 2.2 | 1236 |
| Example 9 | 78 | 152.3 | 3.8 | 7.9 | 1012 |
| Example 10 | 6 | 150.6 | 3.81 | 2.2 | 956 |
| Example 11 | 105 | 148.4 | 3.76 | 12.5 | 879 |
| Example 12 | 6 | 1546.6 | 3.78 | 2.3 | 832 |
| Example 13 | 32 | 154.6 | 3.83 | 7.8 | 1270 |
| Example 14 | 6 | 155.6 | 3.81 | 2.1 | 1345 |
| Example 15 | 8 | 156.7 | 3.84 | 2.3 | 1375 |

TABLE 6-continued

Performance data of button batteries or full batteries of Examples 5-40 according to the above performance test methods

| Example number | Dissolution of Fe and manganese ions after cycling (ppm) | Gram capacity (mAh/g) of button battery at 0.1 C | Average discharge voltage (V) of button battery | Expansion rate (%) of battery cell stored at 60° C. for 30 d | Cycle number corresponding to 80% capacity retention at 45° C. |
|---|---|---|---|---|---|
| Example 16 | 7 | 153.2 | 3.82 | 2.2 | 1278 |
| Example 17 | 158 | 145.3 | 3.79 | 15.4 | 1075 |
| Example 18 | 5 | 148.9 | 3.78 | 2 | 934 |
| Example 19 | 13 | 154.8 | 3.82 | 6.5 | 1276 |
| Example 20 | 7 | 155.6 | 3.83 | 2.3 | 1245 |
| Example 21 | 8 | 156.8 | 3.84 | 2.4 | 1387 |
| Example 22 | 9 | 154.3 | 3.81 | 2.2 | 1167 |
| Example 23 | 12 | 149.7 | 3.78 | 5.4 | 879 |
| Example 24 | 36 | 147.5 | 3.79 | 10.4 | 912 |
| Example 25 | 124 | 150.9 | 3.8 | 13.8 | 975 |
| Example 26 | 34 | 152.3 | 3.81 | 12.4 | 945 |
| Example 27 | 65 | 153.4 | 3.82 | 10.5 | 934 |
| Example 28 | 36 | 153.6 | 3.79 | 8.4 | 934 |
| Example 29 | 24 | 153.4 | 3.78 | 7.6 | 1023 |
| Example 30 | 5 | 149.8 | 3.77 | 2.2 | 921 |
| Example 31 | 145 | 152.8 | 3.78 | 34.5 | 835 |
| Example 32 | 6 | 152.8 | 3.79 | 2.3 | 956 |
| Example 33 | 12 | 155.4 | 3.84 | 2.8 | 1278 |
| Example 34 | 10 | 154.9 | 3.83 | 2.7 | 1283 |
| Example 35 | 15 | 154.3 | 3.83 | 3.6 | 1265 |
| Example 36 | 13 | 153.9 | 3.84 | 3.1 | 1287 |
| Example 37 | 17 | 152.7 | 3.83 | 3.8 | 1254 |
| Example 38 | 29 | 151.1 | 3.84 | 4.3 | 1013 |
| Example 39 | 12 | 155.3 | 3.83 | 3.5 | 1284 |
| Example 40 | 14 | 155.8 | 3.84 | 3.4 | 1259 |

Moreover, in the above Examples 1-1 to 1-33, 2-1 to 2-4, 3-1 to 3-12, 4-1 to 4-4, the electrolyte in the full battery was replaced by an electrolyte prepared by uniformly mixing ethyl ester (EC)/ethyl methyl carbonate (EMC) according to a volume ratio of 3/7 to obtain an organic solvent, and dissolving 12.5 wt. % (based on the weight of the organic solvent) $LiPF_6$ in the above organic solvent, and uniformly stirring a resulting solution; and the electrolyte in the button battery was replaced by an electrolyte composed of a solution of ethylene carbonate (EC), diethyl carbonate (DEC) and dimethyl carbonate (DMC) in a volume ratio of 1:1:1 containing 1 mol/L $LiPF_6$. For the button batteries or full batteries fabricated in Comparative Examples 1-1 to 1-33, 2-1 to 2-4, 3-1 to 3-12, 4-1, dissolution of Mn and Fe after cycling (ppm), gram capacity (mAh/g) of button battery at 0.1 C, average discharge voltage (V) of button battery, cycle number corresponding to 80% capacity retention at 45° C., and expansion rate (i) of battery cell stored at 60 C were tested according to the above methods, and test results were listed in Table 7.

TABLE 7

| Comparative Example number | Dissolution of Mn and Fe after cycling (ppm) | Gram capacity (mAh/g) of button battery at 0.1 C | Average discharge voltage (V) of button battery | Expansion rate (%) of battery cell stored at 60° C. for 30 d | Cycle number corresponding to 80% capacity retention at 45° C. |
|---|---|---|---|---|---|
| Comparative Example 1-1 | 8 | 158.2 | 3.78 | 1.9 | 1328 |
| Comparative Example 1-2 | 63 | 148.9 | 3.75 | 6.4 | 804 |
| Comparative Example 1-3 | 48 | 148.5 | 3.74 | 5.3 | 918 |
| Comparative Example 1-4 | 32 | 147.3 | 3.73 | 4.8 | 968 |
| Comparative Example 1-5 | 20 | 146.8 | 3.73 | 3.6 | 1064 |
| Comparative Example 1-6 | 15 | 145.9 | 3.72 | 2.8 | 1189 |
| Comparative Example 1-7 | 42 | 147.5 | 3.73 | 4.8 | 968 |
| Comparative Example 1-8 | 38 | 146.4 | 3.73 | 4.3 | 1012 |
| Comparative Example 1-9 | 29 | 144.3 | 3.73 | 3.7 | 1108 |
| Comparative Example 1-10 | 18 | 142.1 | 3.73 | 2.8 | 1219 |
| Comparative Example 1-11 | 34 | 147.8 | 3.74 | 5.2 | 927 |
| Comparative Example 1-12 | 22 | 147.6 | 3.74 | 6.1 | 897 |
| Comparative Example 1-13 | 18 | 147.2 | 3.74 | 6.9 | 816 |
| Comparative Example 1-14 | 9 | 147.0 | 3.75 | 7.5 | 764 |
| Comparative Example 1-15 | 18 | 138.7 | 3.86 | 8.4 | 857 |
| Comparative Example 1-16 | 14 | 139.4 | 3.86 | 4.5 | 974 |
| Comparative Example 1-17 | 13 | 153.2 | 3.78 | 3.2 | 1241 |
| Comparative Example 1-18 | 10 | 155.6 | 3.80 | 2.7 | 1245 |
| Comparative Example 1-19 | 9 | 157.6 | 3.80 | 2.1 | 1349 |
| Comparative Example 1-20 | 11 | 157.4 | 3.80 | 2.4 | 1368 |
| Comparative Example 1-21 | 8 | 158.4 | 3.72 | 2.0 | 1459 |
| Comparative Example 1-22 | 12 | 156.9 | 3.83 | 2.8 | 1283 |
| Comparative Example 1-23 | 11 | 157.1 | 3.83 | 2.5 | 1268 |
| Comparative Example 1-24 | 10 | 157.4 | 3.83 | 2.6 | 1329 |
| Comparative Example 1-25 | 10 | 157.3 | 3.78 | 2.4 | 1369 |
| Comparative Example 1-26 | 12 | 156.1 | 3.85 | 2.9 | 1128 |
| Comparative Example 1-27 | 11 | 157.5 | 3.78 | 2.4 | 1394 |
| Comparative Example 1-28 | 13 | 156.8 | 3.89 | 3.2 | 1089 |
| Comparative Example 1-29 | 14 | 156.1 | 3.89 | 3.2 | 1038 |
| Comparative Example 1-30 | 16 | 155.8 | 3.89 | 3.1 | 948 |
| Comparative Example 1-31 | 17 | 155.4 | 3.89 | 3.0 | 917 |
| Comparative Example 1-32 | 18 | 154.8 | 3.89 | 2.8 | 897 |
| Comparative Example 1-33 | 20 | 154.5 | 3.89 | 2.7 | 879 |
| Comparative Example 2-1 | 147 | 145.2 | 3.72 | 5.6 | 698 |
| Comparative Example 2-2 | 97 | 149.2 | 3.74 | 4.7 | 869 |
| Comparative Example 2-3 | 29 | 151.3 | 3.75 | 3.8 | 1027 |

TABLE 7-continued

| Comparative Example number | Dissolution of Mn and Fe after cycling (ppm) | Gram capacity (mAh/g) of button battery at 0.1 C | Average discharge voltage (V) of button battery | Expansion rate (%) of battery cell stored at 60° C. for 30 d | Cycle number corresponding to 80% capacity retention at 45° C. |
|---|---|---|---|---|---|
| Comparative Example 2-4 | 8 | 158.2 | 3.79 | 1.9 | 1328 |
| Comparative Example 3-1 | 49 | 155.2 | 3.67 | 5.6 | 1102 |
| Comparative Example 3-2 | 37 | 155.7 | 3.69 | 4.7 | 1203 |
| Comparative Example 3-3 | 28 | 156.4 | 3.72 | 3.8 | 1275 |
| Comparative Example 3-4 | 17 | 157.8 | 3.75 | 3.1 | 1305 |
| Comparative Example 3-5 | 9 | 158.5 | 3.78 | 2.4 | 1327 |
| Comparative Example 3-6 | 19 | 156.7 | 3.73 | 3.6 | 1257 |
| Comparative Example 3-7 | 38 | 154.8 | 3.69 | 4.8 | 1179 |
| Comparative Example 3-8 | 46 | 153.7 | 3.64 | 6.3 | 986 |
| Comparative Example 3-9 | 38 | 155.4 | 3.76 | 4.9 | 1021 |
| Comparative Example 3-10 | 27 | 156.3 | 3.77 | 4.2 | 1097 |
| Comparative Example 3-11 | 15 | 157.8 | 3.79 | 3.1 | 1184 |
| Comparative Example 3-12 | 11 | 158.1 | 3.79 | 2.4 | 1297 |
| Comparative Example 4-1 | — | 155.4 | 3.71 | 3.4 | 1183 |
| Comparative Example 4-2 | — | 157.8 | 3.78 | 2.4 | 1347 |
| Comparative Example 4-3 | — | 156.5 | 3.73 | 3.1 | 1277 |
| Comparative Example 4-4 | — | 153.8 | 3.69 | 3.9 | 984 |
| Comparative Example 4-5 | — | 155.5 | 3.71 | 3.5 | 895 |
| Comparative Example 4-6 | — | 156.3 | 3.72 | 3.1 | 963 |
| Comparative Example 4-7 | — | 156.9 | 3.74 | 2.7 | 1043 |

Moreover, comparing data in Table 7 with data in Tables 1-3 in the above, it can be seen that the electrolyte composition of the present application can further improve the energy density and cycle performance of the secondary battery.

It should be noted that the present application is not limited to the above embodiments. The embodiments are merely exemplary, and embodiments made within the scope of technical solutions of the present application and having the same technical idea and the same effects are included within the scope of the technical solutions of the present application. In addition, without departing from the scope of the present application, various modifications conceivable by those skilled in the art and other embodiments constructed by combining some components in the above embodiments are further included in the scope of the present application.

What is claimed is:

1. A secondary battery, comprising a cathode piece and a non-aqueous electrolyte, wherein,
the cathode piece comprises a cathode active material, and the cathode active material comprises a core and a shell covering the core,
the core comprises $Li_{1+x}Mn_{1-y}A_yP_{1-z}R_zO_4$, wherein x=−0.100 to 0.100, y=0.001 to 0.500, z=0.001 to 0.100, A is one or more selected from the group consisting of Zn, Al, Na, K, Mg, Mo, W, Ti, V, Zr, Fe, Ni, Co, Ga, Sn, Sb, Nb, and Ge, and R is one or more selected from the group consisting of B, Si, N and S;
the shell comprises: a first cladding layer covering the core, and a second cladding layer covering the first cladding layer, wherein,
the first cladding layer comprises pyrophosphate $MP_2O_7$ and phosphate $XPO_4$, wherein M and X are each independently one or more selected from the group consisting of Li, Fe, Ni, Mg, Co, Cu, Zn, Ti, Ag, Zr, Nb, and Al;
the second cladding layer comprises carbon;
the non-aqueous electrolyte comprises a first lithium salt and a first additive;
the first lithium salt comprises one or more selected from the group consisting of $LiN(C_mF_{2m+1}SO_2)(C_nF_{2n+1}SO_2)$ and $Li(FSO_2)_2N$, in which, m and n represent positive integers; and
the first additive comprises one or more of a compound represented by Formula 1,

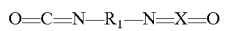

Formula 1, in which, $R_1$ represents any one of a $C_2$-$C_{10}$ alkylene, a $C_2$-$C_{10}$ heteroalkylene, a $C_6$-$C_{18}$ arylene, a $C_2$-$C_{18}$ heteroarylene, a $C_3$-$C_{18}$ alicyclylene, a $C_3$-$C_{18}$ heteroalicyclylene, which are substituted by one or more $R_a$ or are unsubstituted, and $R_a$ comprises one or more selected from a halogen atom, —CN, —NCO, —OH, —COOH, —SOOH, a —CO-$OR_b$, a $C_2$-$C_{10}$ alkyl, a $C_2$-$C_{10}$ alkenyl, a $C_2$-$C_{10}$ alkynyl, a $C_2$-$C_{10}$ oxaalkyl, and $R_b$ is any one selected from $C_1$-$C_{10}$ alkyls.

2. The secondary battery according to claim 1, wherein $R_1$ represents any one of a $C_2$-$C_{10}$ alkylene, a $C_2$-$C_{10}$ oxaalkylene, a $C_2$-$C_{10}$ azaalkylene, phenylene, naphthylene, anthrylene, cyclobutylene, cyclopentylene, cyclohexylene, biphenylene, methylenediphenylene, which are substituted by one or more Ra or are unsubstituted;

the $R_a$ comprises one or more selected from halogen atoms, —CN, $C_2$-$C_3$ alkyl; and/or a number of $R_a$ in the compound represented by the Formula 1 is 0, 1, 2, 3, or 4.

3. The secondary battery according to claim 1, wherein the first additive comprises one or more of the following compounds:

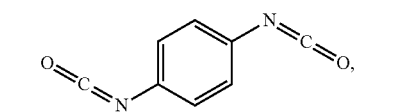

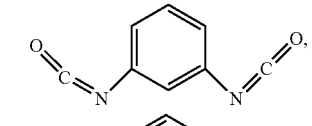

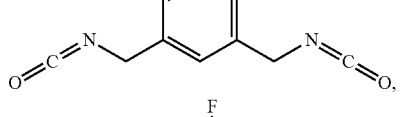

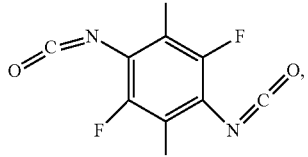

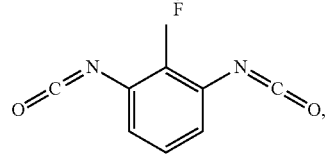

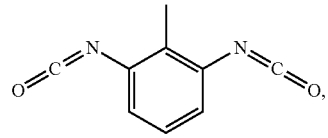

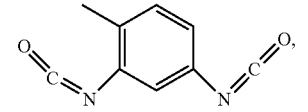

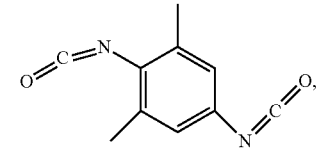

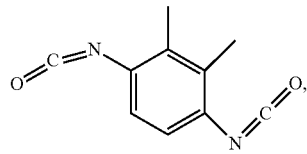

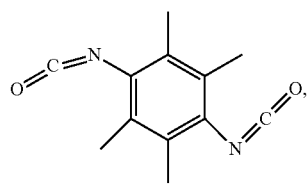

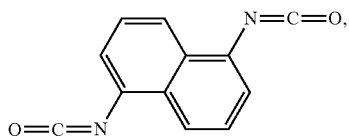

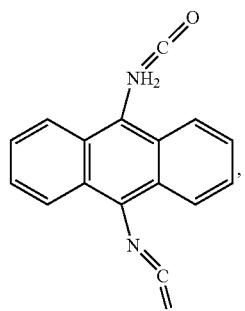

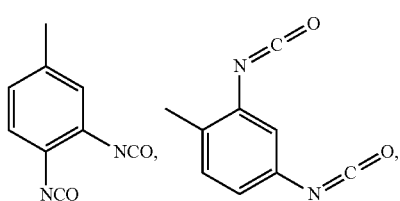

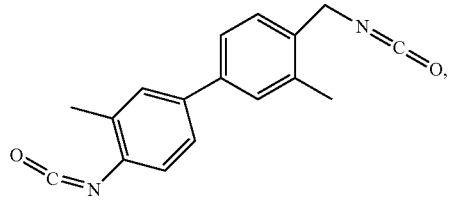

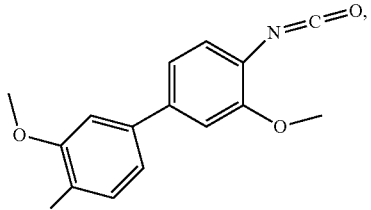

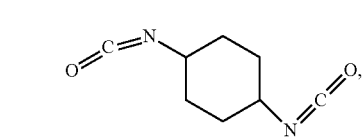

61

-continued

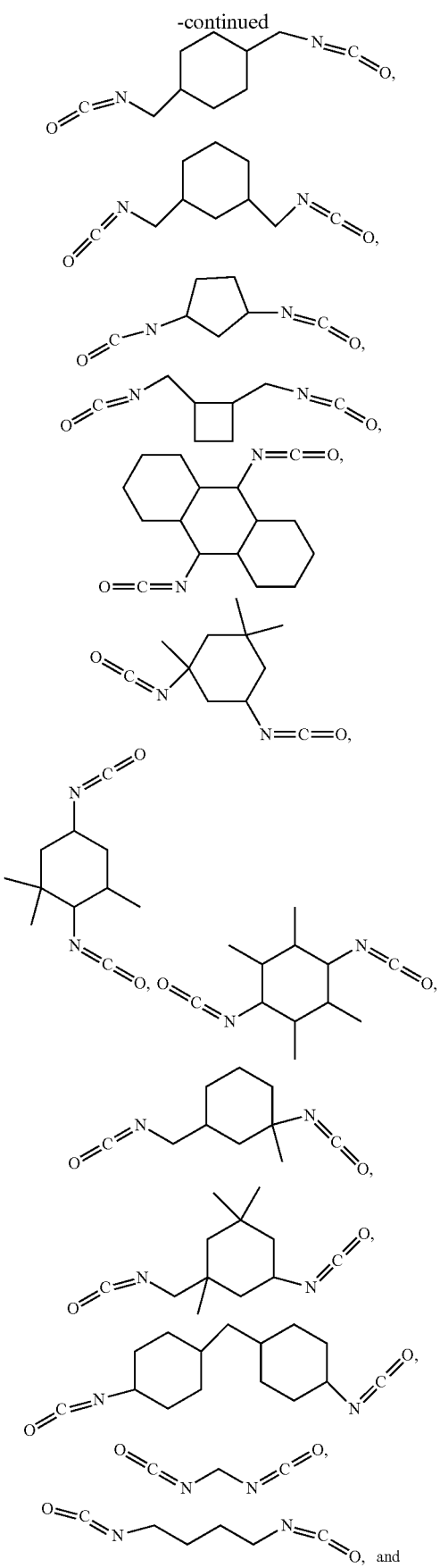

and

62

-continued

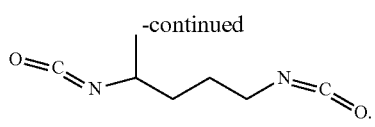

4. The secondary battery according to claim 1, wherein m and n each independently represent 0, 1, 2, 3, or 4; and/or, the first lithium salt is any one selected from $LiN(CF_3SO_2)(FSO_2)$, $Li(CF_3SO_2)_2N$, and $LiN(C_4F_9SO_2)(FSO_2)$; and the first additive is any one selected from the following compounds:

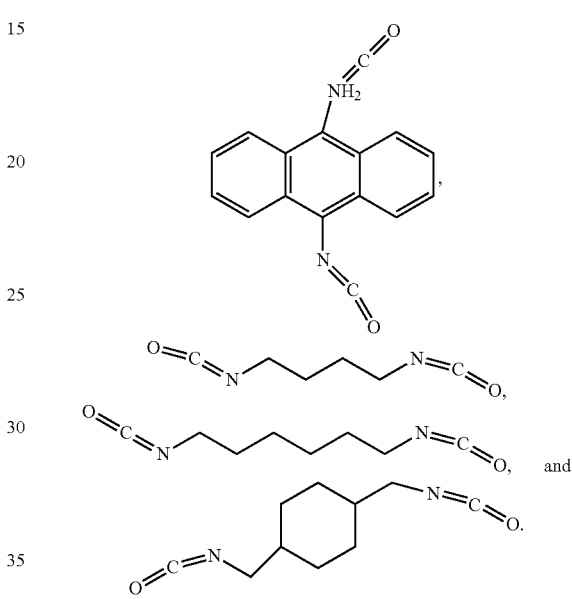

5. The secondary battery according to claim 1, wherein based on a total weight of the non-aqueous electrolyte,
a content of the first lithium salt is W1 wt. %, W1 is between 0.1 and 48; and
a content of the first additive is W2 wt. %, W2 is between 0.01 and 20.

6. The secondary battery according to claim 5, wherein based on a weight of the core, a coating amount of the first cladding layer is C1 wt. %, C1 is greater than 0 and less than or equal to 7, and/or based on the weight of the core, the coating amount of the second cladding layer is C2 wt. %, C2 is greater than 0 and less than or equal to 6; and
a ratio of (W1+W2)/(C1+C2) is defined as Q, and Q is between 0.1 and 10.

7. The secondary battery according to claim 1, wherein the non-aqueous electrolyte further comprises a second lithium salt, and the second lithium salt comprises one or more of lithium difluorophosphate, lithium difluorodioxalate phosphate, lithium difluorooxalate borate, lithium bisoxalate borate, $LiPF_6$, and $LiBF_4$.

8. The secondary battery according to claim 7, wherein based on a total weight of the non-aqueous electrolyte, a content of the second lithium salt is W3 wt. %, W3 is between 0.01 and 20.

9. The secondary battery according to claim 1, wherein the non-aqueous electrolyte further comprises a second additive; and the second additive comprises one or more of the group consisting of a cyclic carbonate compound containing an unsaturated bond, a halogen-substituted saturated cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphorous acid ester compound, a phosphate ester compound, and a borate ester compound.

10. The secondary battery according to claim 1, wherein the non-aqueous electrolyte further comprises an organic solvent, wherein the organic solvent comprises one or more of a cyclic carbonate compound, a chain carbonate compound, and a carboxylate compound.

11. The secondary battery according to claim 1, wherein based on a weight of the core, a coating amount of the first cladding layer is C1 wt. %, C1 is greater than 0 and less than or equal to 7; and/or, based on the weight of the core, a coating amount of the second cladding layer is C2 wt. %, C2 is greater than 0 and less than or equal to 6.

12. The secondary battery according to claim 1, wherein a weight ratio of pyrophosphate to phosphate in the first cladding layer is between 1:3 and 3:1.

13. The secondary battery according to claim 1, wherein an interplanar spacing of phosphate in the first cladding layer is 0.345-0.358 nm, and an included angle of a crystal direction (111) is 24.25°-26.45°; and an interplanar spacing of pyrophosphate in the first cladding layer is 0.293-0.326 nm, and the included angle of the crystal direction (111) is 26.41°-32.57°.

14. The secondary battery according to claim 1, wherein a ratio of y to 1-y in the core is between 1:10 and 10:1.

15. The secondary battery according to claim 1, wherein a ratio of z to 1-z in the core is between 1:9 and 1:999.

16. The secondary battery according to claim 1, wherein crystallinities of pyrophosphate and phosphate are independently between 10% and 100%.

17. The secondary battery according to claim 1, wherein the A is at least two selected from Fe, Ti, V, Ni, Co, and Mg.

18. The secondary battery according to claim 1, wherein the cathode active material has a concentration of Li/Mn antisite defect of less than 4%; and/or the cathode active material has a lattice change rate of less than 6%; and/or the cathode active material has a surface oxygen valence state of less than −1.88; and/or the cathode active material has a compacted density at 3 tons of above 2.0 g/cm$^3$.

19. A battery module, comprising the secondary battery according to claim 1.

20. A battery pack, comprising the battery module according to claim 19.

21. An electric device, comprising at least one selected from the secondary battery according to claim 1.

* * * * *